(12) United States Patent
Steinke et al.

(10) Patent No.: US 6,241,034 B1
(45) Date of Patent: Jun. 5, 2001

(54) CUTTER ELEMENT WITH EXPANDED CREST GEOMETRY

(75) Inventors: Stephen C. Steinke, The Woodlands; Gary R. Portwood, Kingwood; Gary E. Garcia; David P. Moran, both of The Woodlands, all of TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/146,095

(22) Filed: Sep. 3, 1998

Related U.S. Application Data

(63) Continuation-in-part of application No. 08/668,109, filed on Jun. 21, 1996, now Pat. No. 5,813,485.
(60) Provisional application No. 60/057,915, filed on Sep. 4, 1997.

(51) Int. Cl.$^7$ .................................................... E21B 10/08
(52) U.S. Cl. ..................... 175/331; 175/336; 175/341; 175/420.1; 175/430; 175/432
(58) Field of Search .................................. 175/331, 336, 175/341, 374, 412, 413, 420.1, 426, 428, 430, 432

(56) References Cited

U.S. PATENT DOCUMENTS

| | | | |
|---|---|---|---|
| 3,952,815 | 4/1976 | Dysart | 175/374 |
| 4,150,728 | * 4/1979 | Garner et al. | 175/374 |
| 5,152,194 | 10/1992 | Keshavan et al. | 76/108.2 |
| 5,172,779 | 12/1992 | Siracki et al. | 175/430 |
| 5,265,685 | 11/1993 | Keith et al. | 175/431 |
| 5,291,807 | 3/1994 | Vanderford et al. | |
| 5,579,856 | 12/1996 | Bird | 175/375 |
| 5,743,346 | * 4/1998 | Floud et al. | 175/432 X |
| 5,755,301 | * 5/1998 | Love et al. | 175/426 |
| 5,758,733 | * 6/1998 | Scott et al. | 175/432 |
| 5,813,485 | * 9/1998 | Portwood | 175/430 |
| 5,967,249 | * 10/1999 | Butcher | 175/432 X |

FOREIGN PATENT DOCUMENTS

| | | |
|---|---|---|
| 1113037 | 5/1968 | (GB) . |
| 1193717 | 6/1970 | (GB) . |
| 1343040 | 1/1974 | (GB) . |
| 1534535 | 12/1978 | (GB) . |
| 9748877 | 12/1997 | (WO) . |

* cited by examiner

*Primary Examiner*—Roger Schoeppel
(74) *Attorney, Agent, or Firm*—Conley, Rose & Tayon, P.C.

(57) ABSTRACT

A cutter element for a drill bit. The cutter element has a base portion and an extending portion and the extending portion has either a zero draft or a negative draft with respect to the base portion. The non-positive draft allows more of the borehole bottom to be scraped using fewer cutter elements. The cutter elements having non-positive draft can be either tungsten carbide inserts or steel teeth.

36 Claims, 20 Drawing Sheets

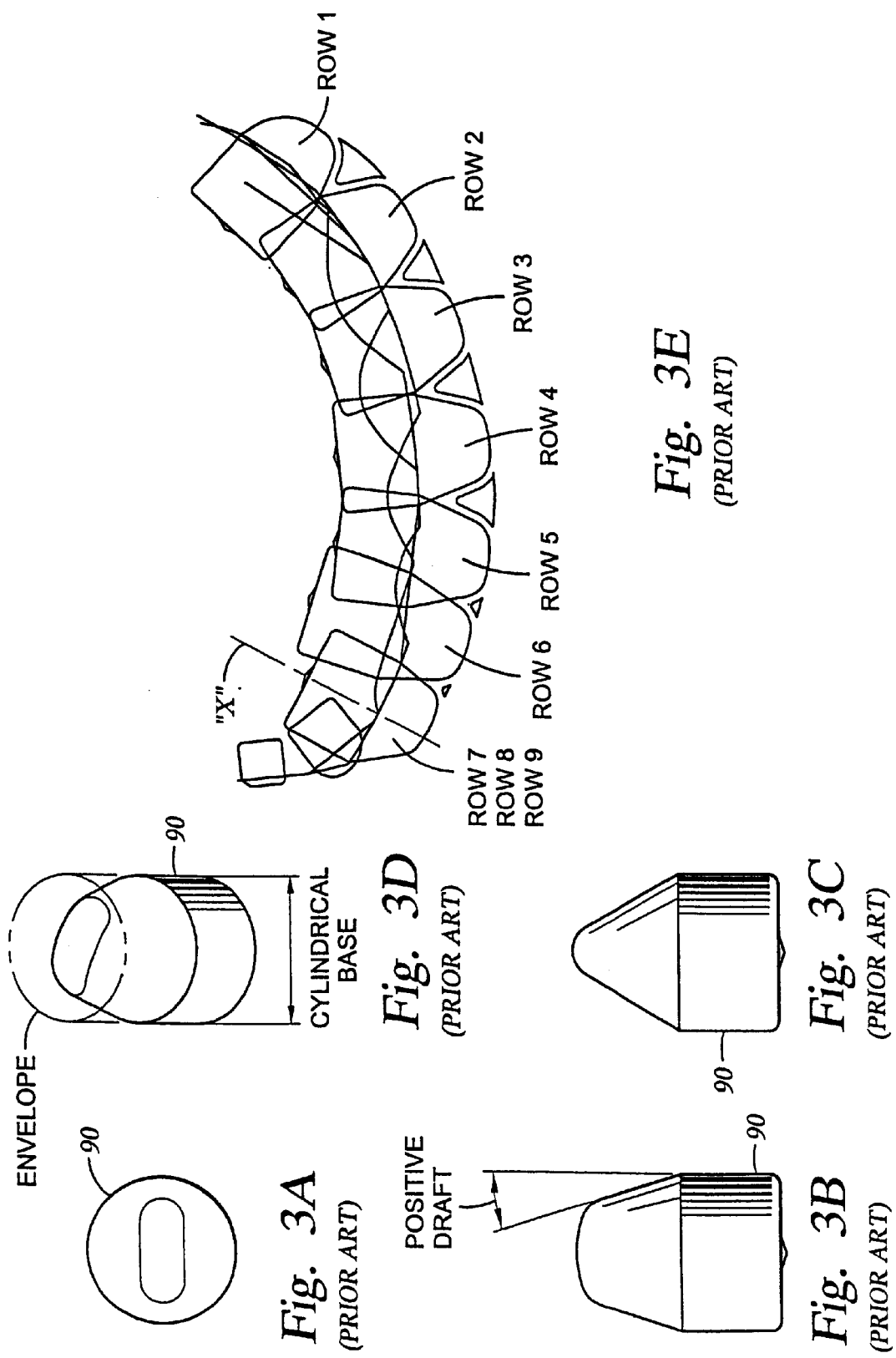

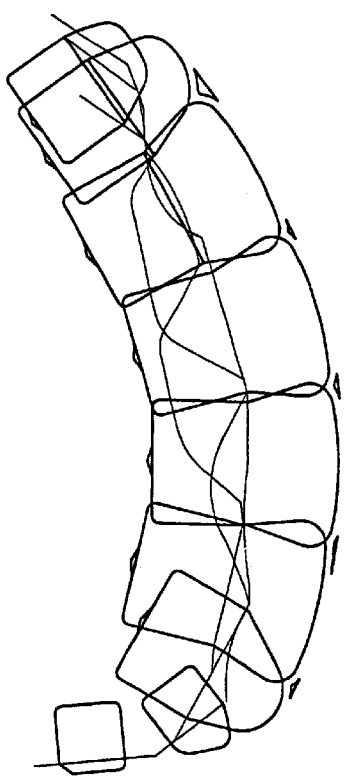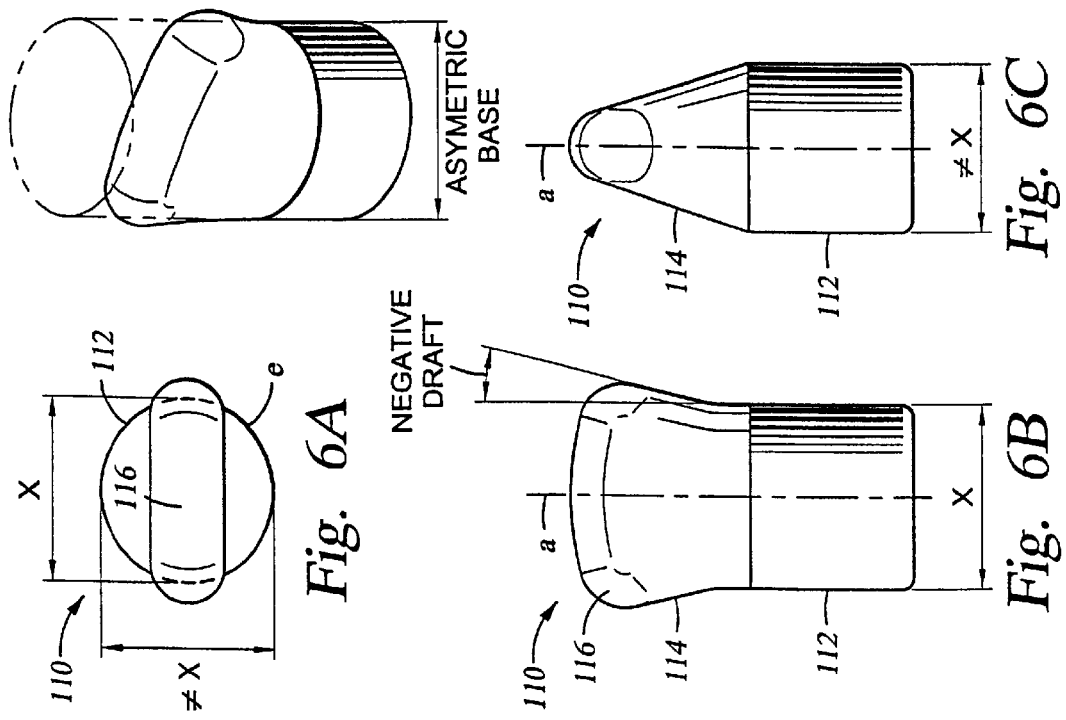

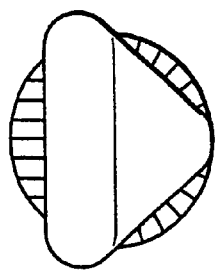
*Fig. 7A*
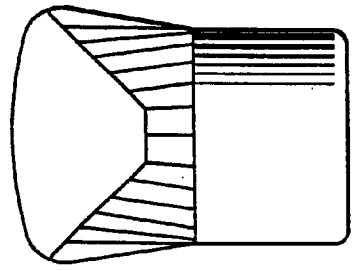
*Fig. 7B*
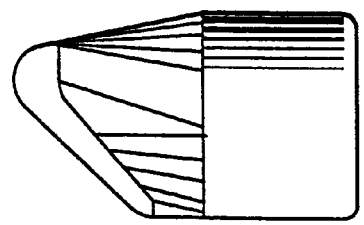
*Fig. 7C*
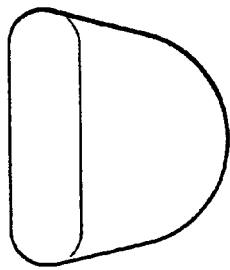
*Fig. 8A*
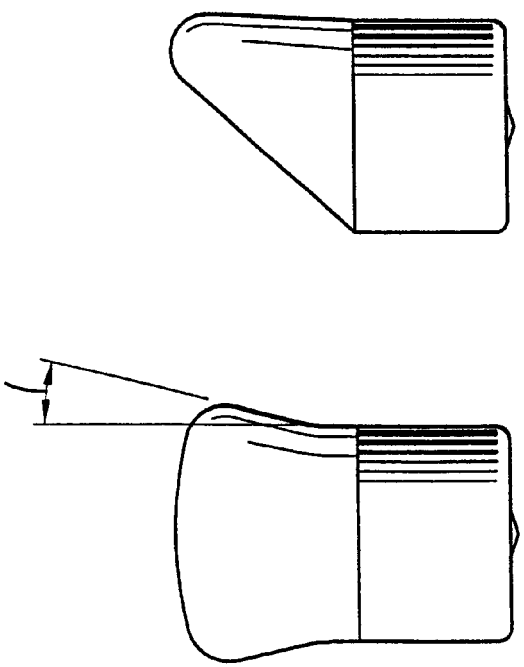
*Fig. 8B*
*Fig. 8C*

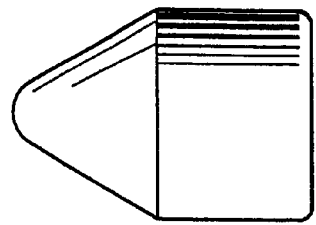
Fig. 10C
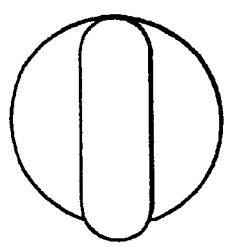
Fig. 10A
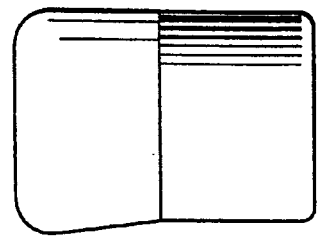
Fig. 10B
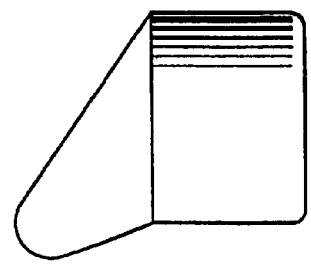
Fig. 9C
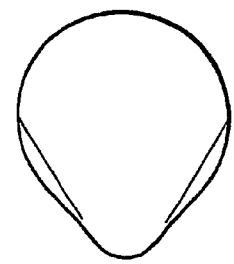
Fig. 9A
Fig. 9B

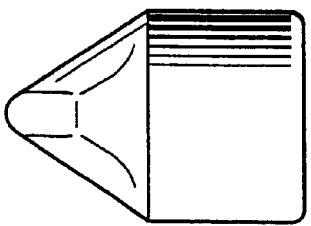
Fig. 16C
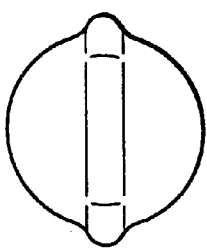
Fig. 16A
Fig. 16B
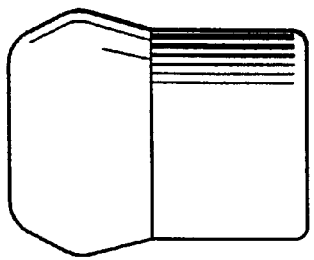
Fig. 15C
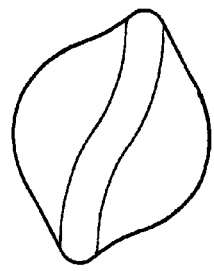
Fig. 15A
Fig. 15B

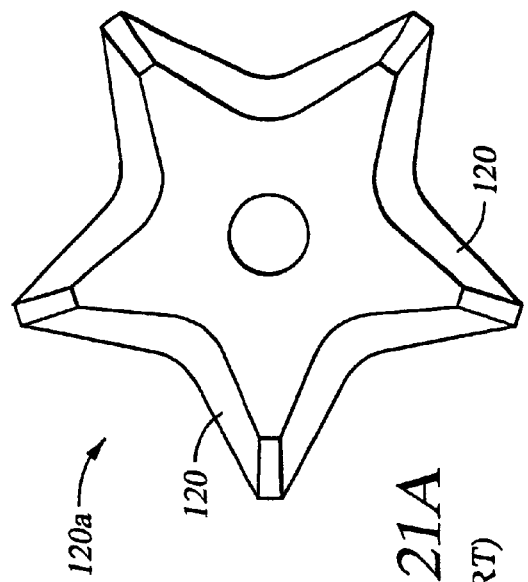
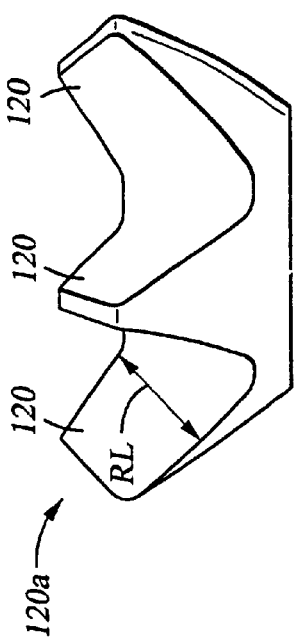
*Fig. 21A* (PRIOR ART)
*Fig. 21B* (PRIOR ART)
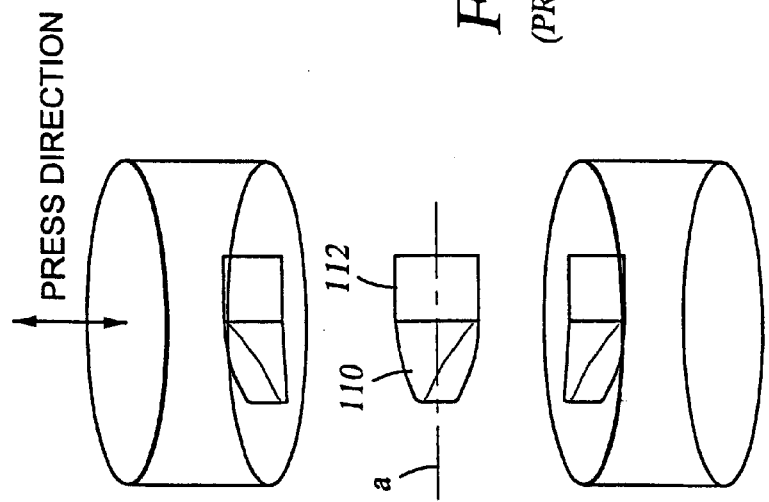
*Fig. 20*
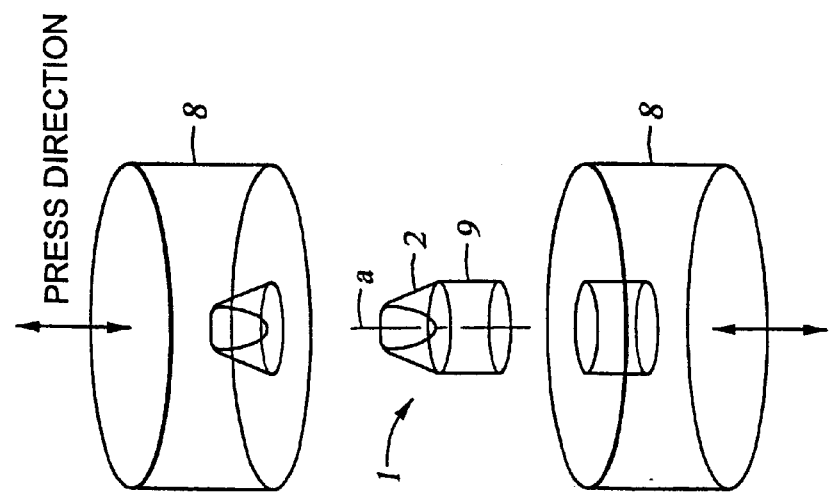
*Fig. 19*

CUTTER ELEMENT WITH EXPANDED CREST GEOMETRY

CROSS-REFERENCE TO RELATED APPLICATION

The present application claims the benefit of 35 U.S.C. 111(b) provisional application Ser. No. 60/057,915 filed Sep. 4, 1997 and entitled Cutter Element with Expanded Crest Geometry and is a continuation-in-part of U.S. Ser. No. 08/688,109, filed Jun. 21, 1996 now U.S. Pat. No. 5,813,485, entitled "Cutter Element Adapted to Withstand Tensile Stress.

FIELD OF THE INVENTION

The invention relates generally to earth-boring bits used to drill a borehole for the ultimate recovery of oil, gas or minerals. More particularly, the invention relates to rolling cone rock bits and to an improved cutting structure for such bits. Still more particularly, the invention relates to a cutter element having an expanded crest geometry which extends up to and beyond the envelope of its base portion.

BACKGROUND OF THE INVENTION

An earth-boring drill bit is typically mounted on the lower end of a drill string and is rotated by rotating the drill string at the surface or by actuation of downhole motors or turbines, or by both methods. With weight applied to the drill string, the rotating drill bit engages the earthen formation and proceeds to form a borehole along a predetermined path toward a target zone. The borehole formed in the drilling process will have a diameter generally equal to the diameter or "gage" of the drill bit.

A typical earth-boring bit includes one or more rotatable cutters that perform their cutting function due to the rolling movement of the cutters acting against the formation material. The cutters roll and slide upon the bottom of the borehole as the bit is rotated, the cutters thereby engaging and disintegrating the formation material in its path. The rotatable cutters may be described as generally conical in shape and are therefore sometimes referred to as rolling cones. Such bits typically include a bit body with a plurality of journal segment legs. The rolling cone cutters are mounted on bearing pin shafts that extend downwardly and inwardly from the journal segment legs. The borehole is formed as the gouging and scraping or crushing and chipping action of the rotary cones remove chips of formation material which are carried upward and out of the borehole by drilling fluid which is pumped downwardly through the drill pipe and out of the bit.

The earth-disintegrating action of the rolling cone cutters is enhanced by providing the cutters with a plurality of cutter elements. Cutter elements are generally two types: inserts formed of a very hard material, such as cemented tungsten carbide, that are press fit into undersized apertures or similarly secured in the cone surface; or teeth that are milled, cast or otherwise integrally formed from the material of the rolling cone. Bits having tungsten carbide inserts are typically referred to as "TCI" bits, while those having teeth formed from the cone material are known as "steel tooth bits."

The cutting surfaces of inserts are, in some instances, coated with a very hard "superabrasive" coating such as polycrystalline diamond (PCD) or cubic boron nitride (PCBN). Superabrasive materials are significantly harder than cemented tungsten carbide. As used herein, the term "superabrasive" means a material having a hardness of at least 2,700 Knoop (kg/mm$^2$). Conventional PCD grades have a hardness range of about 5,000–8,000 Knoop, while PCBN grades have a hardness range of about 2,700–3,500 Knoop. By way of comparison, a typical cemented tungsten carbide grade used to form cutter elements has a hardness of about 1475 Knoop. Similarly, the teeth of steel tooth bits may be coated with a hard metal layer generally referred to as hardfacing. In each case, the cutter elements on the rotating cutters functionally breakup the formation to create new borehole by a combination of gouging and scraping or chipping and crushing.

The cost of drilling a borehole is proportional to the length of time it takes to drill to the desired depth and location. In oil and gas drilling, the time required to drill the well, in turn, is greatly affected by the number of times the drill bit must be changed in order to reach the targeted formation. This is the case because each time the bit is changed, the entire string of drill pipe, which may be miles long, must be retrieved from the borehole, section by section. Once the drill string has been retrieved and the new bit installed, the bit must be lowered to the bottom of the borehole on the drill string, which again must be constructed section by section. As is thus obvious, this process, known as a "trip" of the drill string, requires considerable time, effort and expense. Accordingly, it is always desirable to employ drill bits which will drill faster and longer and which are usable over a wider range of formation hardness.

The length of time that a drill bit may be employed before it must be changed depends upon its rate of penetration ("ROP"), as well as its durability or ability to maintain an acceptable ROP. The form and positioning of the cutter elements (both steel teeth and TCI inserts) upon the cone cutters greatly impact bit durability and ROP and thus are critical to the success of a particular bit design.

Bit durability is, in part, measured by a bit's ability to "hold gage", meaning its ability to maintain a full gage borehole diameter over the entire length of the borehole. To assist in maintaining the gage of a borehole, conventional rolling cone bits typically employ a heel row of hard metal inserts on the heel surface of the rolling cone cutters. The heel surface is a generally frustoconical surface and is configured and positioned so as to generally align with and ream the sidewall of the borehole as the bit rotates. The inserts in the heel surface contact the borehole wall with a sliding motion and thus generally may be described as scraping or reaming the borehole sidewall.

In addition to the heel row inserts, conventional bits typically include a primary "gage" row of cutter elements mounted adjacent to the heel surface but oriented and sized so as to cut the corner as well as the bottom of the borehole. Conventional bits can also contain a secondary gage trimming row or a nestled gage row with lesser extension to assist in trimming the bore hole wall. Conventional bits also include a number of additional rows of cutter elements that are located on the cones in rows disposed radially inward from the gage row. These cutter elements are sized and configured for cutting the bottom of the borehole and are typically described as primary "inner row" cutter elements. Together, the primary gage and primary inner row cutter elements of the bit form the "primary rows." Primary row cutter elements are the cutter elements that project the most outwardly from the body of the rolling cone for cutting the bore hole bottom.

A review of post run bit performance data from 1991 through 1995 indicated that most aggressive roller cone cutting structures from both milled tooth and tungsten carbide insert bits were sub-optimal at addressing very soft rock formations (i.e. less than 2000 psi unconfined rock compressive strength). Ultra-soft to soft formations typically consist of clays, claystones, very soft shales, occasionally limy marls, and dispersed or unconsolidated sands, typically exhibit plastic behavior. Very soft or weak clays/shales vary in their mechanical response from more competent (harder) shales, under the same compression loads, as applied in rotary rock bit drilling. Soft shales respond plastically, or simply deform under the applied load, as opposed to a brittle failure or rupture (crack) formed in more competent rocks to create the cutting or chip. In these very soft/plastic formation applications, we cannot rely on conventional brittle rock failure modes, where cracks propagate from the loaded tooth penetration crater to the adjacent tooth craters, to create a chip or cutting. For this reason, the cutting structure arrangement must mechanically gouge away a large percentage of the hole bottom in order to drill efficiently. In these types of formations, maximum mechanical efficiency is accomplished by maximizing the bottom hole coverage of the inserts contacting the hole bottom per revolution so as to maximize the gouging and scraping action.

SUMMARY OF THE INVENTION

The present invention provides maximum scraping action and allows greater flexibility in the number of cutter elements used on a drill bit. According to the present invention, at least one cutter element on a bit is provided with a non-positive draft. The term "draft" is used to refer to the relationship between the extending portion of the cutter element and envelope defined by the cutter element base. More particularly, the term "non-positive draft" is used to refer to cutter elements in which the extending portion of the cutting element extends out to or beyond the envelope of the base portion. According to the present invention, the non-positive draft can take the form of either a zero or a negative draft. The concepts of the present invention can be used in cutter elements that have non-circular or non-cylindrical bases and can be used in tungsten carbide inserts, in tungsten carbide inserts coated with superabrasive, and in steel teeth.

BRIEF DESCRIPTION OF THE DRAWINGS

Other objects and advantages of the invention will become apparent upon reading the following detailed description and upon reference to the accompanying drawings in which:

FIGS. 3A–D are top, front, side and perspective views, respectively, of a prior art chisel insert;

FIGS. 6A–D are top, front, side and perspective views, respectively, of a chisel insert constructed in accordance with a second embodiment of the present invention;

FIG. 3E shows the cutter elements of a prior art drill bit rotated into a single plane;

FIG. 6E shows the cutter elements of FIGS. 6A–D rotated into a single plane;

FIGS. 7A–C are top, front and side views, respectively, of an offset crest chisel with a negative draft;

FIGS. 8A–C are top, front and side views, respectively, of an offset crest chisel with a negative draft and a reinforcement rib;

FIGS. 9A–C are top, front and side views, respectively, of an offset conical insert with a negative draft;

FIGS. 10A–C are top, front and side views, respectively, of a biased negative draft chisel insert;

FIGS. 15A–C are top, front and side views, respectively, of a spline or S-shaped crest chisel insert with negative draft;

FIGS. 16A–C are top, front and side views, respectively, of a partial negative draft chisel insert;

FIG. 19 is a simplified illustration of a prior art insert pressing technique;

FIG. 20 is a simplified illustration of an insert pressing technique in accordance with the present invention;

FIGS. 21A–B are top and side views, respectively, of a row of prior art steel teeth;

Figure 1:
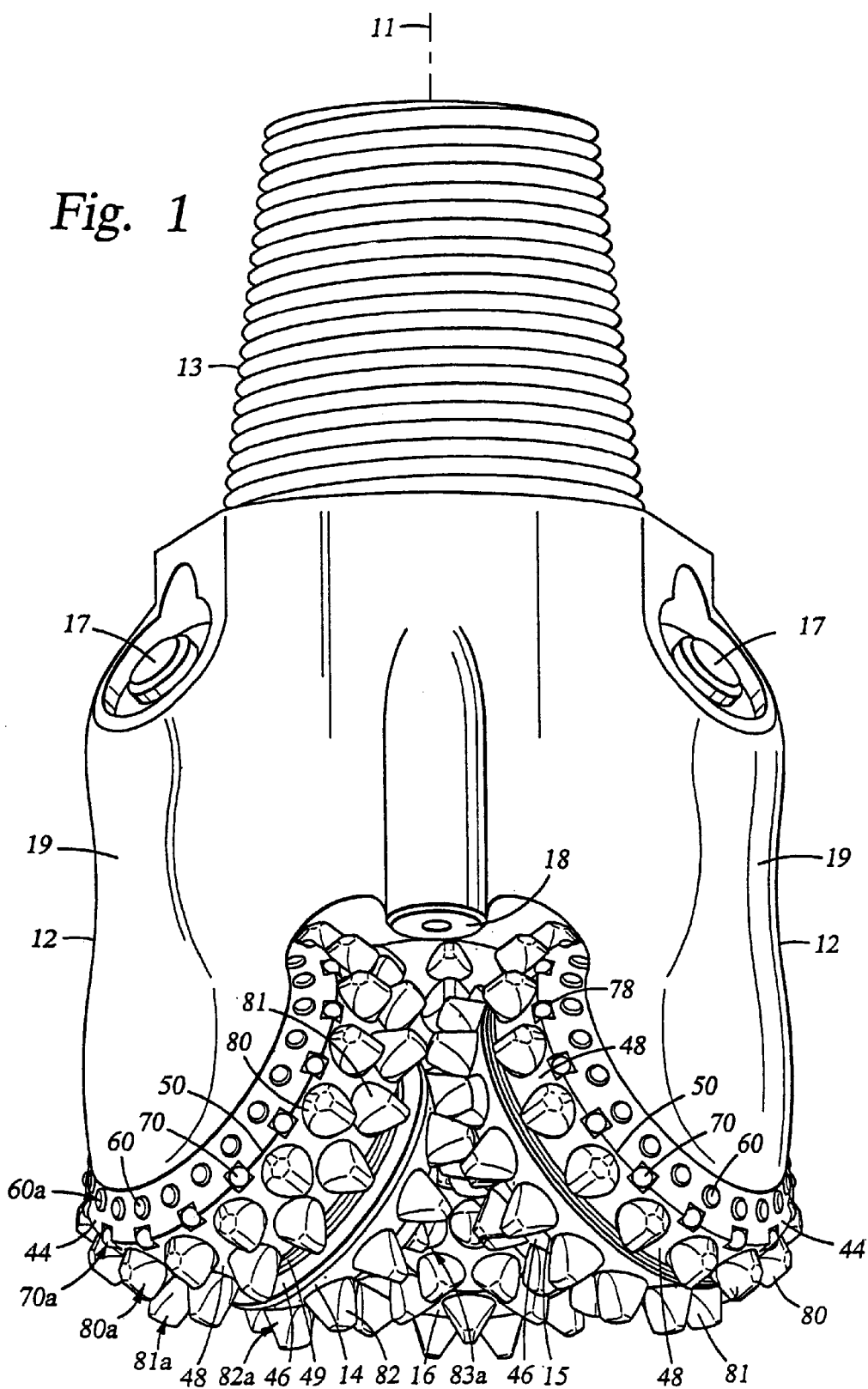
FIG. 1 is a perspective view of an earth-boring bit.

While the invention is susceptible to various modifications and alternative forms, specific embodiments thereof are shown by way of example in the drawings and are described in detail below. It should be understood, however, that the drawings and detailed description thereof are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring first to FIG. 1, an earth-boring bit 10 made in accordance with the present invention includes a central axis 11 and a bit body 12 having a threaded section 13 on its upper end for securing the bit to the drill string (not shown). Bit 10 has a predetermined gage diameter as defined by three rolling cone cutters 14, 15, 16, which are rotatably mounted on bearing shafts that depend from the bit body 12. Bit body 12 is composed of three sections or legs 19 (two shown in FIG. 1) that are welded together to form bit body 12. Bit 10 further includes a plurality of nozzles 18 that are provided for directing drilling fluid toward the bottom of the borehole and around cutters 14–16. Bit 10 further includes lubricant reservoirs 17 that supply lubricant to the bearings of each of the cutters.

Figure 2:
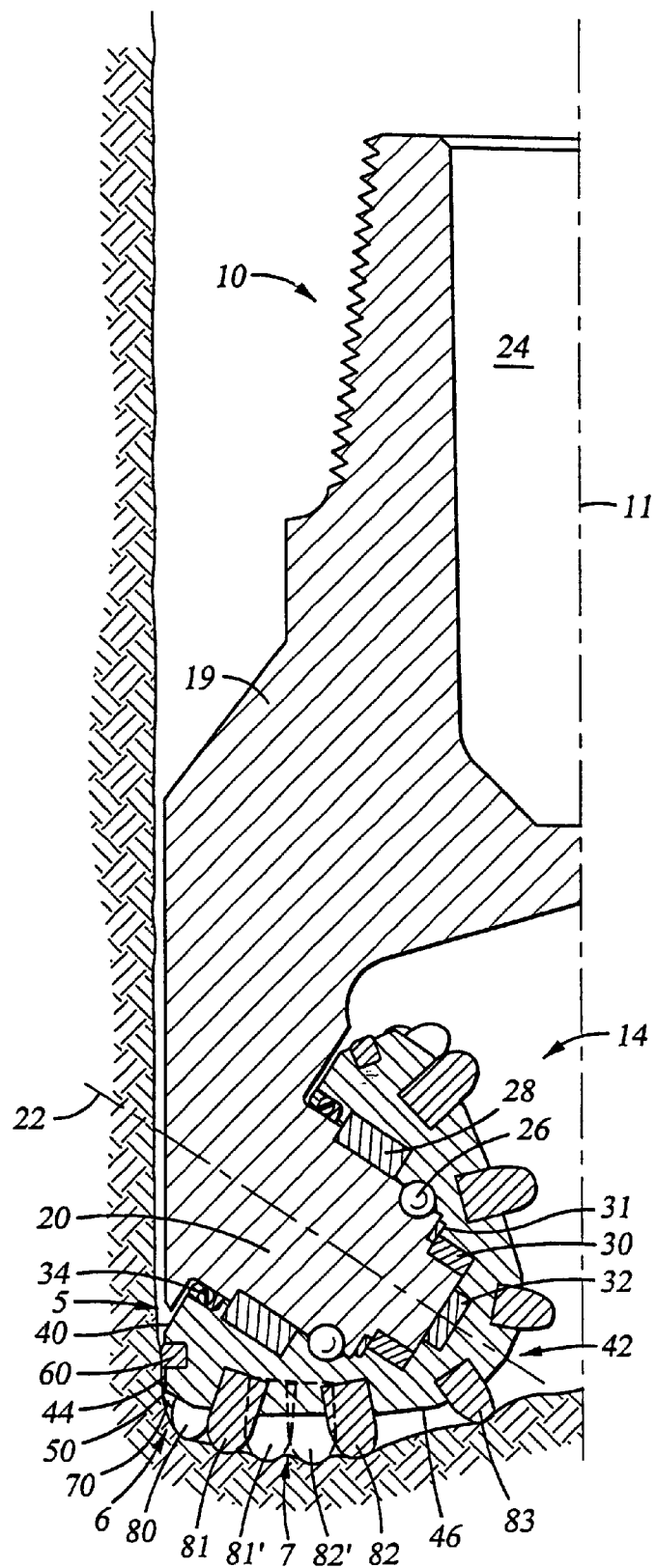
FIG. 2 is a partial section view taken through one leg and one rolling cone cutter of the bit shown in FIG. 1.

Referring now to FIG. 2, in conjunction with FIG. 1, each cutter 14–16 is rotatably mounted on a pin or journal 20, with an axis of rotation 22 orientated generally downwardly and inwardly toward the center of the bit. Drilling fluid is pumped from the surface through fluid passage 24 where it is circulated through an internal passageway (not shown) to nozzles 18 (FIG. 1). Each cutter 14–16 is typically secured on pin 20 by ball bearings 26. In the embodiment shown, radial and axial thrust are absorbed by roller bearings 28, 30, thrust washer 31 and thrust plug 32; however, the invention is not limited to use in a roller bearing bit, but may equally be applied in a friction bearing bit. In such instances, the cones 14, 15, 16 would be mounted on pins 20 without roller bearings 28, 30. In both roller bearing and friction bearing bits, lubricant may be supplied from reservoir 17 to the bearings by apparatus that is omitted from the figures for clarity. The lubricant is sealed and drilling fluid excluded by means of an annular seal 34. The borehole created by bit 10 includes sidewall 5, corner portion 6 and bottom 7, best shown in FIG. 2. Referring still to FIGS. 1 and 2, each cutter 14–16 includes a backface 40 and nose portion 42 spaced apart from backface 40. Cutters 14–16 further include a frustoconical surface 44 that is adapted to retain cutter elements that scrape or ream the sidewalls of the borehole as cutters 14–16 rotate about the borehole bottom. Frustoconical surface 44 will be referred to herein as the "heel" surface of cutters 14–16, it being understood, however, that the same surface may be sometimes referred to by others in the art as the "gage" surface of a rolling cone cutter.

Extending between heel surface 44 and nose 42 is a generally conical surface 46 adapted for supporting cutter elements that gouge or crush the borehole bottom 7 as the cone cutters rotate about the borehole. Conical surface 46 typically includes a plurality of generally frustoconical segments 48 generally referred to as "lands" which are employed to support and secure the cutter elements as described in more detail below. Grooves 49 are formed in cone surface 46 between adjacent lands 48. Frustoconical heel surface 44 and conical surface 46 converge in a circumferential edge or shoulder 50. Although referred to herein as an "edge" or "shoulder," it should be understood that shoulder 50 may be contoured, such as by a radius, to various degrees such that shoulder 50 will define a contoured zone of convergence between frustoconical heel surface 44 and the conical surface 46.

In the embodiment of the invention shown in FIGS. 1 and 2, each cutter 14–16 includes a plurality of wear resistant inserts 60, 70, 80 that include generally cylindrical base portions that are secured by interference fit into mating sockets drilled into the lands of the cone cutter, and cutting portions connected to the base portions having cutting surfaces that extend from cone surfaces 44, 46 for cutting formation material. The present invention will be understood with reference to one such cutter 14, cones 15, 16 being similarly, although not necessarily identically, configured.

Cone cutter 14 includes a plurality of heel row inserts 60 that are secured in a circumferential row 60a in the frustoconical heel surface 44. Cutter 14 further includes a circumferential row 70a of nestled gage inserts 70 secured to cutter 14 in locations along or near the circumferential shoulder 50 to cut the borehole wall. Cutter 14 further includes a plurality of primary bottom hole cutting inserts 80, 81, 82, 83 secured to cone surface 46 and arranged in spaced-apart inner rows 80a, 81a, 82a, 83a, respectively. Relieved areas or lands 78 (best shown in FIG. 1) are formed about nestled gage cutter elements 70 to assist in mounting inserts 70. As understood by those skilled in this art, heel inserts 60 generally function to scrape or ream the borehole sidewall 5 to maintain the borehole at full gage and prevent erosion and abrasion of heel surface 44. Cutter elements 81, 82 and 83 of inner rows 81a, 82a, 83a are employed primarily to gouge and remove formation material from the borehole bottom 7. Inner rows 80a, 81a, 82a, 83a are arranged and spaced on cutter 14 so as not to interfere with the inner rows on each of the other cone cutters 15, 16.

It is common for some of the cutter elements to be arranged on conical surface 46 so as to "intermesh" with each other. More specifically, performance expectations require that the cone bodies be as large as possible within the borehole diameter so as to allow use of the maximum possible bearing size and to provide adequate recess depth for cutter elements. To achieve maximum cone cutter diameter and still have acceptable insert protrusion, some of the rows of cutter elements are arranged to pass between the rows of cutter elements on adjacent cones as the bit rotates. In some cases, certain rows of cutter elements extend so far that clearance areas corresponding to these rows are provided on adjacent cones so as to allow the primary cutter elements on adjacent cutters to intermesh farther. The term "intermesh" as used herein is defined to mean overlap of any part of at least one primary cutter element on one cone cutter with the envelope defined by the maximum extension of the cutter elements on an adjacent cutter.

Figure 4A:
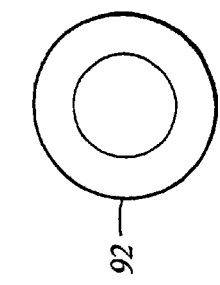
FIGS. 4A–C are top, front, and side views, respectively, of a prior art conical insert.
Figure 4B:
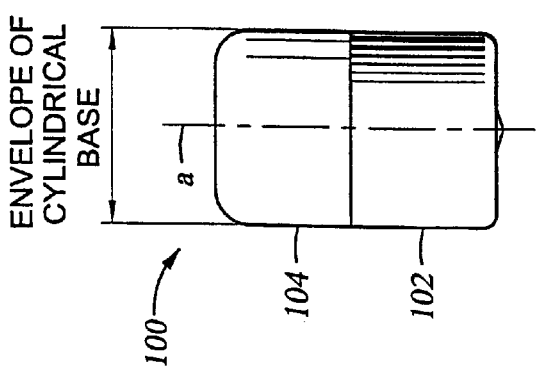
Figure 4C:
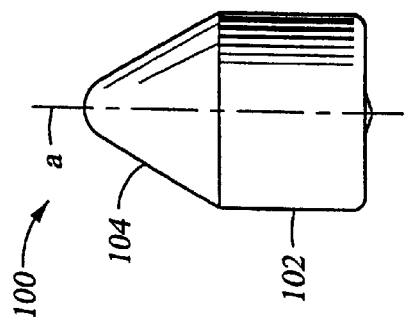

Referring now to the particular construction of cutter elements, a prior art chisel insert 90 is shown in FIGS. 3A–D and a prior art conical insert 92 is shown in FIGS. 4A–C. As shown in these figures, the entire cutting portion of the insert is contained within the envelope of the cylindrical base portion. This is because the conventional way of manufacturing these inserts is by a punch and die method, which requires positive draft at the cutting portion so as to allow the die halves to separate after pressing operations. This restriction in manufacturing process imposes limitations on the geometry of the cutting portion of the insert. These limitations in turn prevent the optimization of this geometry for maximizing the bottom hole coverage and scraping action needed to increase rate of penetration in soft formations. Typical positive draft angles utilized in the manufacturing of these inserts are not less than 10 degrees as measured per side, as shown in FIGS. 3B and 4B.

The drawings show bases that are generally cylindrical, with some being of circular cross-section and some being non-circular (e.g. oval or elliptical). However, the bases may be of any convenient cross-sectional shape and need not be cylindrical. While the following discussion and corresponding Figures relate to cutter inserts having cylindrical bases, it will be understood that the principles of the present invention can be applied with equal advantage to cutter inserts having non-cylindrical bases. In cutter elements having non-circular or cylindrical bases, "positive draft" refers to instances where the entire cutting portion of the insert is contained within the envelope defined by projecting the shape of the base portion along the longitudinal axis of the cutter element. As used herein, the term "longitudinal axis" refers to the longitudinal axis of the base portion.

Figure 5A:
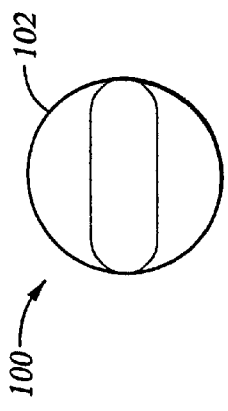
FIGS. 5A–C are top, front and side views, respectively, of a chisel insert constructed in accordance with a first embodiment of the present invention.
Figure 5B:
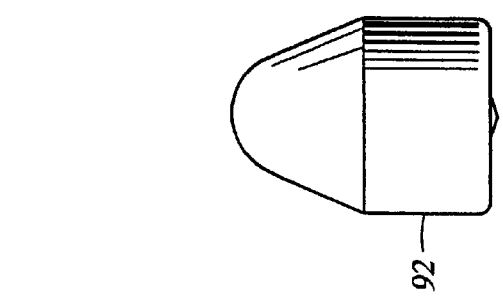
Figure 5C:
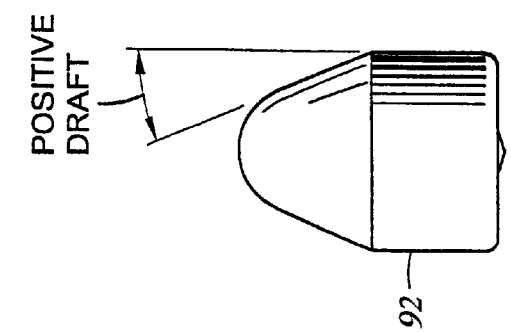

Referring now to FIGS. 5A–C, the chisel insert 100 of the present invention having an expanded geometry provides for increased mechanical scraping/shearing action by providing increased crest length beyond that formed on prior art inserts manufactured using conventional manufacturing techniques. Insert 100 includes base 102 and cutting portion 104. The insert axis is shown as "a." Further optimization of mechanical scraping/shearing action can be achieved with additional expansion of cutting portion geometry as shown in FIGS. 6A–D. As shown in FIGS. 6A–D, insert 110 has a non-circular base 112 and cutting portion 114 which includes expanded crest 116. Using the terminology employed with conventional manufacturing means, this novel insert has a negative draft 114, on the cutting portion which extends beyond the envelope "e" of the cylindrical base portion. It is preferably made by the manufacturing techniques described below.

Conventional roller cone drill bits generate an uncut area on the bore hole bottom known in the art as uncut bottom as shown in FIG. 3E. In FIG. 3E, the cutter elements from all rolling cone cutters are depicted in rotated profile, that is, with the cutting profiles of the cutter elements shown as they would appear if rotated into a single plane. The uncut bottom is the area on the bore hole bottom that is not contacted by the crests of the primary row cutter elements. If this uncut area is allowed to build up, it forms a ridge. In some drilling applications this ridge is never realized, because the formation material is easily fractured and the ridge tends to break off. In very soft rock formations that are not easily fractured, however, the formation yields plastically and the ridge builds up. This ridge build-up is detrimental to the cutter elements and slows the drill bit's rate of penetration. Ridges of rock left untouched by conventional cutting structure arrangements are reduced or eliminated by the use of the present invention as illustrated in FIG. 6E. FIG. 6E shows the reduction in uncut bottom or increased bottom hole coverage provided by the expanded crest geometry of the cutter elements of the present invention.

To obtain the same degree of bottom hole coverage shown in FIG. 6E using conventional cutter elements, the diameter of the base portion of the cutter elements would typically be increased to achieve the corresponding increase in crest width. This increase in insert diameter would have the result of reduced clearance between inserts in the same row, as well as decreased insert-to-insert clearances between adjacent cones. To achieve adequate clearances in these areas would require severe compromise in insert count and placement. These compromises are avoided through the use of the present invention.

This invention is particularly suited for cutter elements used in the primary rows where, in soft formations, maximum shearing and scraping action of the rock is the preferred method of cutting. Cutter elements with elongated crests are used in these formations to provide shearing capability. The crest width of these cutter elements inserts influences the aggressiveness of the cutting action relative to the formation. Thus, the function of expanded crest widths on an insert made in accordance with the principles of the present invention can increase the volume of shearing/scraping performed by the cutter element relative to a conventional prior art chisel insert.

Hard formations can also be addressed by this invention. Increased cutter volume can be attained by expanding the insert extension beyond the base while maintaining effective clearances between cutter elements in adjacent positions in the same row and between elements in adjacent rows (both on the same cone and in different cones). With an expanded insert extension and a reduced base diameter, insert quantities can be increased, thereby providing greater cutter density with additional strikes to the formation. The increase in cutter density also provides additional wear time for the insert, thereby extending bit life.

Depending on the shape and/or orientation of the cutter element, bottom hole coverage can be maximized to reduce or eliminate the amount of uncut hole bottom. If the cutter elements are positioned to maximize bottom hole coverage, the number of bit revolutions necessary to gouge and scrape the entire hole bottom can be reduced 40–60% from a typical conventional 3-cone tungsten carbide insert (TCI) rock bit.

Cutter Element Shapes

There are numerous variations within this invention for the configuration of the cutting portion of the insert that extend beyond the envelope of the base portion. The geometry of the cutting element can be sculptured or non-sculptured. As used herein, the terms "contoured," "sculpted" and "sculptured" refer to cutting surfaces that can be described as continuously curved surfaces wherein relatively small radii (typically less than 0.080 inches) are not used to break sharp edges or round-off transitions between adjacent distinct surfaces as is typical with many conventionally-designed cutter elements. The cutting portion of the cutting element can extend up to and beyond the envelope of its base anywhere along the perimeter of the base portion and any multitude of times. The preferred manufacturing techniques described below allow for new insert shapes that extend up to and beyond the "envelope" of the base portion of the insert thereby opening the door for countless new geometries. Several embodiments of the invention as applied to insert type cutter elements are illustrated in FIGS. 5 through 18. Like the embodiments shown in FIGS. 5A–C, 6A–D, these embodiments incorporate the principles of the present invention. For each embodiment in FIGS. 7 through 18, the comments in Table I set out the mechanical advantages that are believed to result from the specific features of that embodiment.

TABLE I

Figure 12A:
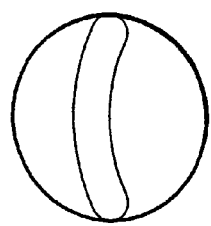
FIGS. 12A–C are top, front and side views, respectively, of an arc crest chisel insert with zero draft.
Figure 12B:
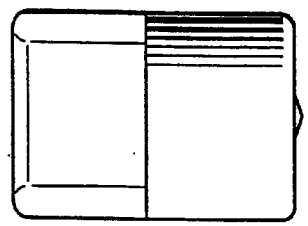
Figure 12C:
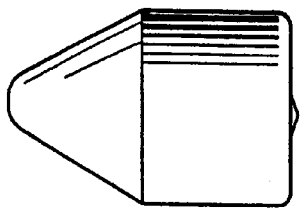
Figure 11A:
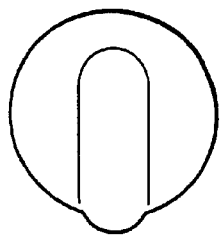
FIGS. 11A–C are top, front and side views, respectively, of a partial biased negative draft chisel insert.
Figure 11C:
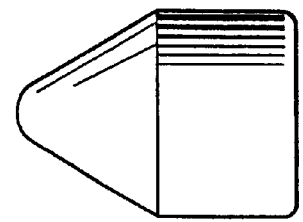
Figure 11B:
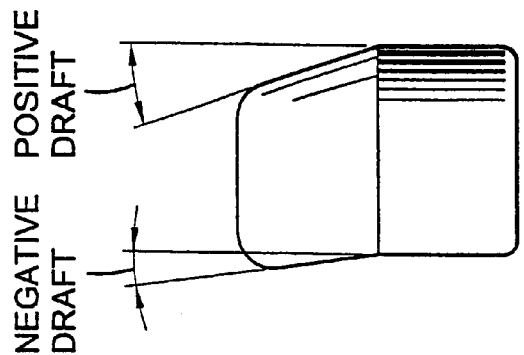
Figure 14A:
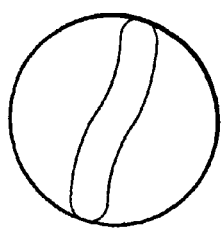
FIGS. 14A–C are top, front and side views, respectively, of a spline or S-shaped crest chisel insert with zero draft.
Figure 14B:
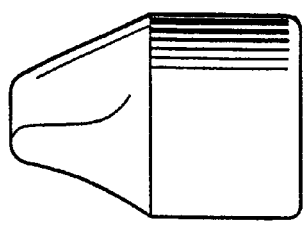
Figure 14C:
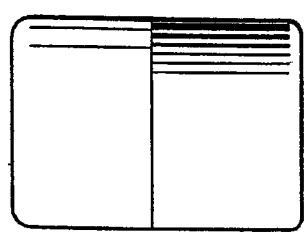
Figure 13A:
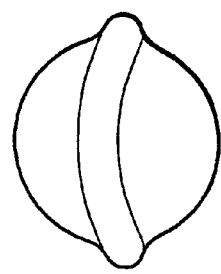
FIGS. 13A–C are top, front and side views, respectively, of an arc crest chisel insert with negative draft.
Figure 13B:
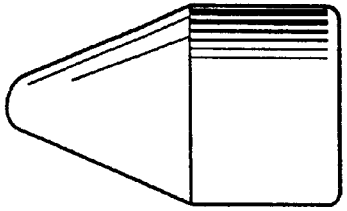
Figure 13C:
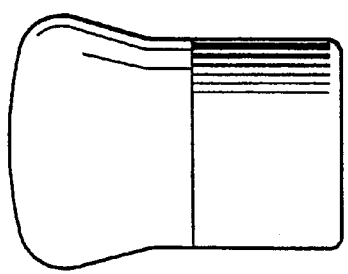
Figure 17A:
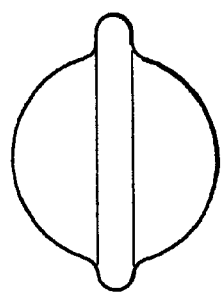
FIGS. 17A–C are top, front and side views, respectively, of an offset crest chisel insert with negative draft on its leading flank.
Figure 17B:
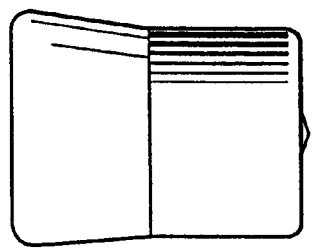
Figure 17C:
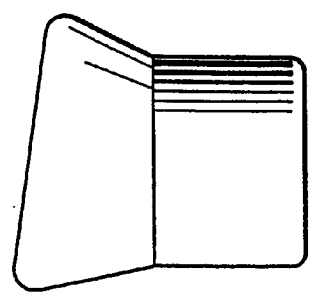
Figure 18A:
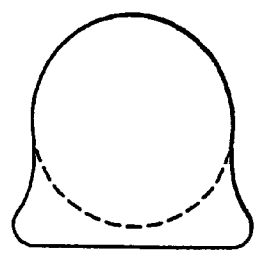
FIGS. 18A–C are top, front and side views, respectively, of a slant crest chisel insert with negative draft.
Figure 18B:
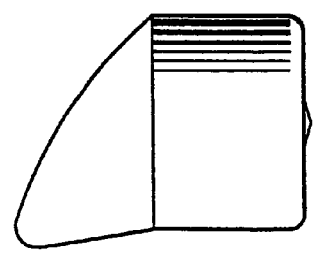
Figure 18C:
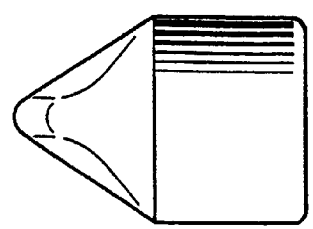

| FIG. Number | Insert Description | Comment |
|---|---|---|
| FIG. 7A-C | Offset crest chisel with negative draft. | Optimize aggressive scraping action in specific applications. |
| FIG. 8A-C | Offset crest chisel with negative draft and reinforcement rib. | The reinforcement rib provides increased support to improve durability when drilling through hard stringers. |
| FIG. 9A-C | Offset conical with negative draft. | Optimize scraping action in non-plastic formations. |
| FIG. 10A-C | Biased negative draft chisel. | Optimize scraping action where insert-to-insert clearances between cones is constrained. |
| FIG. 11A-C | Partial biased negative draft chisel. | Optimize scraping action where insert to insert clearances between cones is constrained. |
| FIG. 12A-C | Arc crest chisel with zero draft. | Structural support for insert crest/corners and improved scraping action. |
| FIG. 13A-C | Arc crest chisel with negative draft. | Structural support for insert crest/corners and optimized scraping action. |
| FIG. 14A-C | Spline crest chisel with zero draft. | Structural support for insert crest/corners and improved scraping action. |
| FIG. 15A-C | Spline crest chisel with negative draft. | Structural support for insert crest/corners and optimized scraping action. |
| FIG. 16A-C | Partial negative draft chisel. | Insert chisel crest corner protection for tougher applications. |
| FIG. 17A-C | Offset crest chisel with negative draft on leading flank. | Aggressive positive rake for maximum formation removal. |
| FIG. 18A-C | Slant crest chisel with negative draft. | Increased unit load upon entering the formation to maximize penetration. |

Cutter Element Placement

Further optimization of the cutter elements of the present invention can be achieved by their orientation and placement within the cone bodies. This will further maximize the desired level of scraping action for increased mechanical efficiency.

Figure 28:
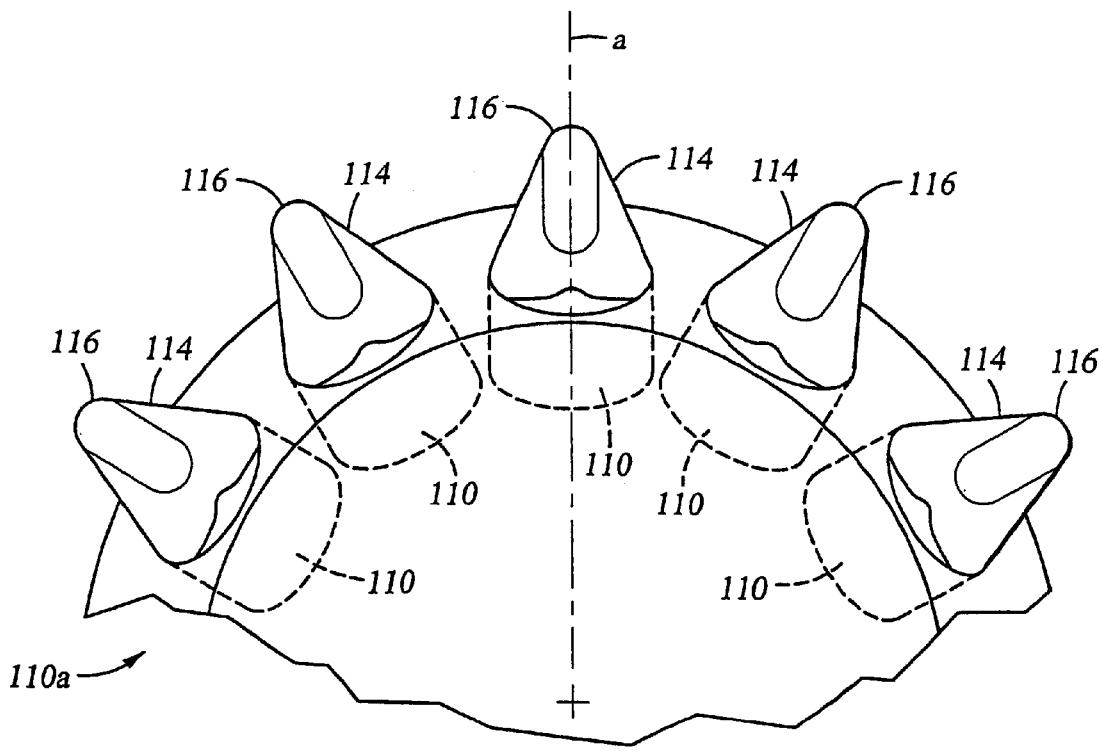
FIG. 28 is a layout showing a first configuration of the cutter elements of the present invention with respect to a projection of the roller cone axis.
Figure 29:
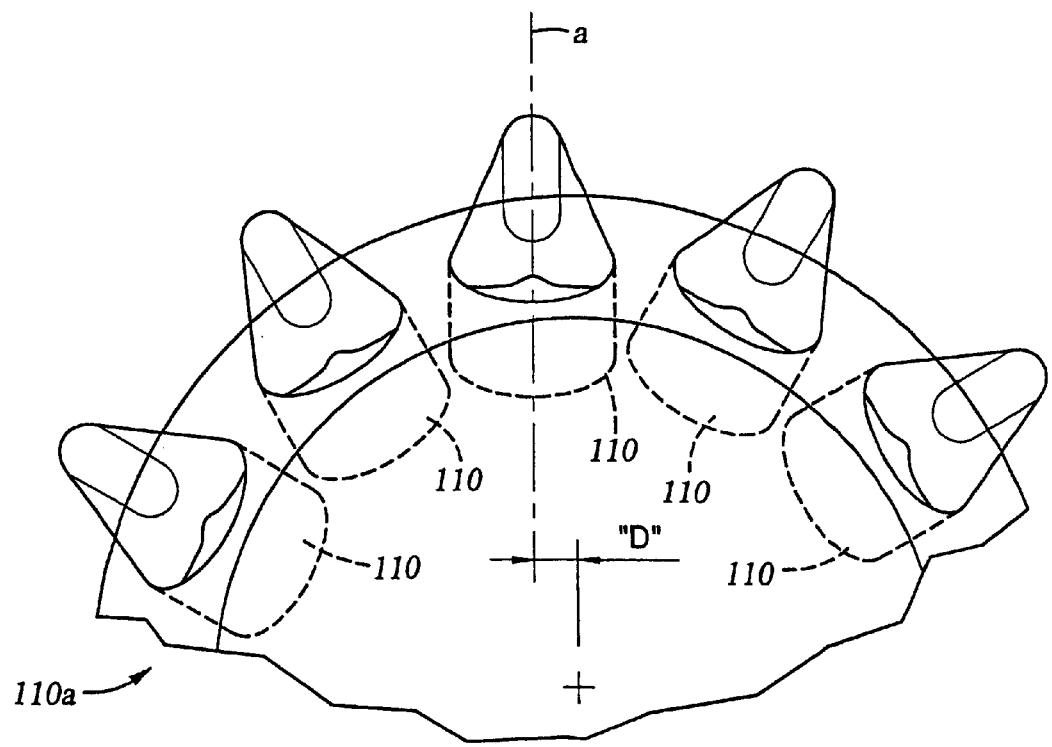
FIG. 29 is a layout showing an alternative configuration of the cutter elements of the present invention with respect to a projection of the roller cone axis.

Referring to FIG. 28, novel inserts 110 are shown placed in a conventional orientation in a row 110a with the axis of each insert being coplanar with the cone axis. Another arrangement is shown in FIG. 29, in which each insert 110 is oriented in the cone body such that the axis "a" of the cylindrical portion of the insert is offset a distance "D" with respect of the cone axis. This further gives the designer flexibility to optimize the scraping action with regards to the specific formation and application.

Figure 30:
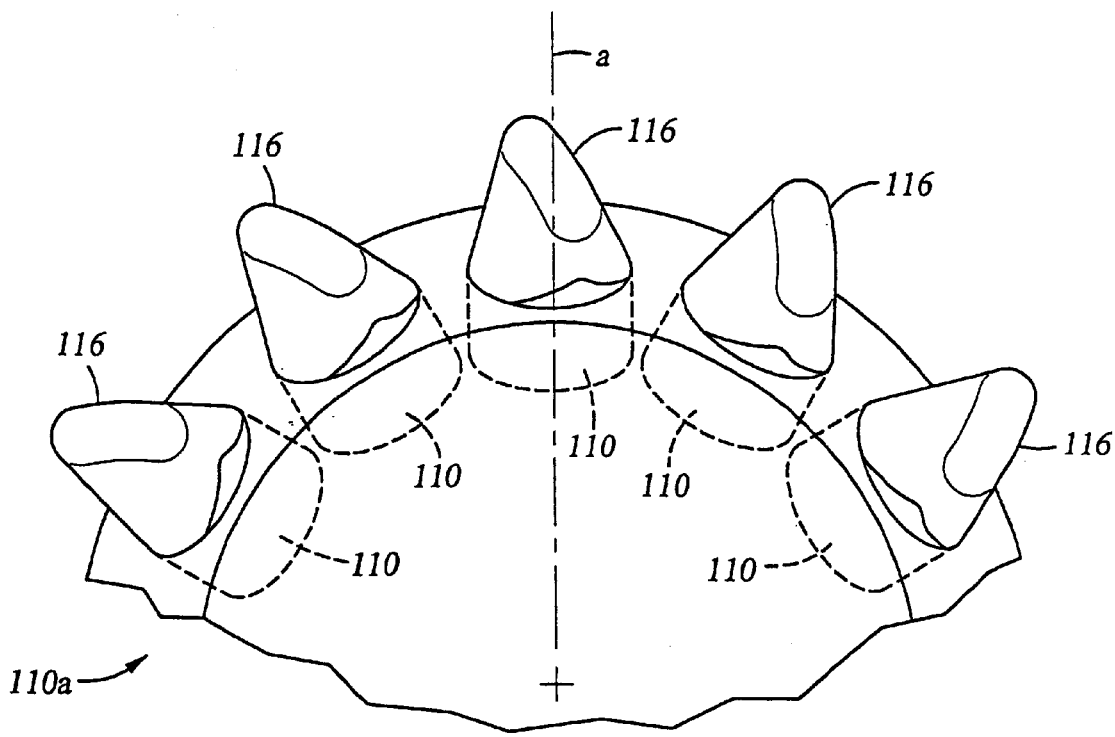
FIG. 30 is a layout showing a second alternative configuration of the cutter elements of the present invention with respect to a projection of the roller cone axis.
Figure 30A:
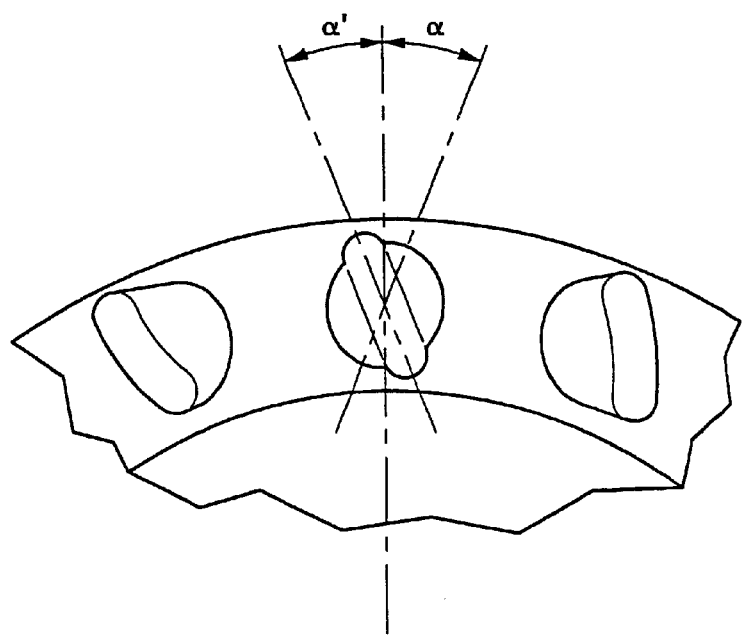
FIG. 30A is a different view of the configuration of FIG. 30, looking along the axis of the cutter element and showing its orientation with respect to a projection of the cone axis.
Figure 31:
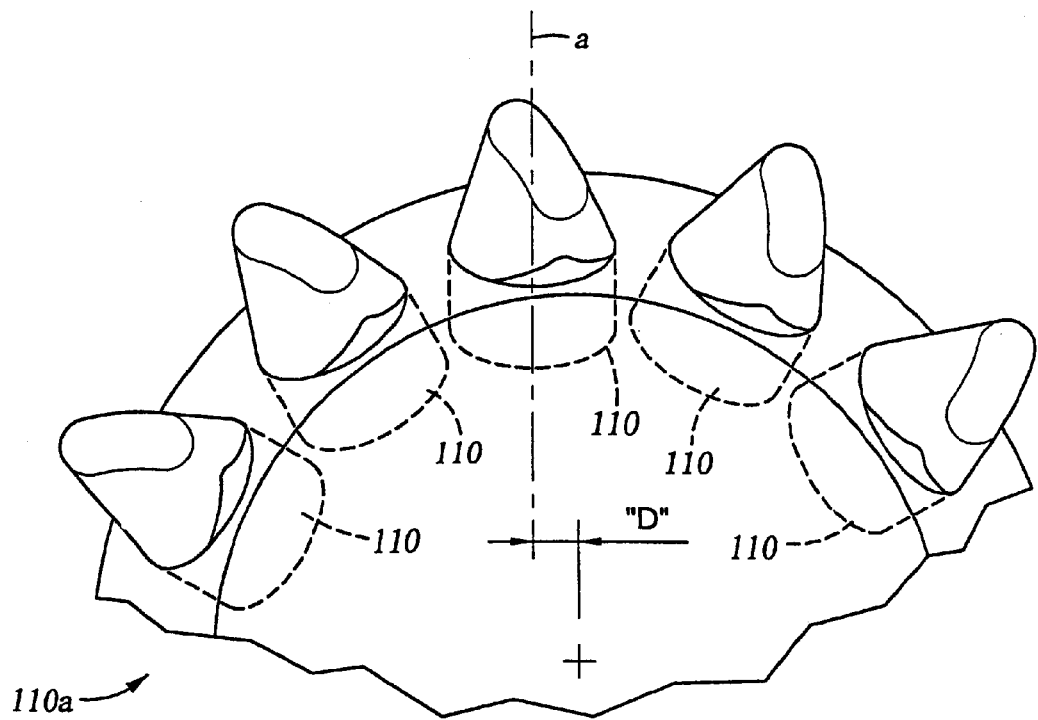
FIG. 31 is a layout showing a third alternative configuration of the cutter elements of the present invention with respect to a projection of the roller cone axis.

FIGS. 30 and 30A show another orientation wherein the crest 116 of the insert 110 is rotated about the insert axis "a" such that an angle $\alpha$ is formed with respect to the projection of the cone axis. It will be understood that in certain applications, it may be advantageous to rotate one or more inserts in the opposite direction such as by an amount $\alpha'$. FIG. 31 shows another embodiment wherein the insert 110 is both offset a distance "D" and rotated about its axis "a." Any of the inserts shown in FIGS. 5–8 may be employed in the arrangements or orientations shown in FIGS. 28–31. The cutter elements 110 can be mechanically or metallurgically secured in the cone by various methods, such as, interference fit, brazing, welding, molding, casting, or chemical bonding. The inserts described in the FIGS. 5 and 7–18 and orientations 28–31 are shown with a cylindrical base portion for interference fit into a matching socket. It will be understood negative draft does not require that the base portion be cylindrical, but does require that the cutting portion of the insert extend up to or beyond the noncylindrical envelope defined by the base portion, as shown in FIGS. 6A–D.

Insert Material Types

An insert of the present invention can be made of tungsten carbide and in addition can be partially or fully coated with a "superabrasive" (i.e., a material having a hardness of at least 2,700 Knoop $kg/mm^2$) such as PCD, PCBN, etc.

Insert Manufacturing Techniques

Conventional rolling cone bit inserts are manufactured by press and die operations. As shown in FIG. 19, the top and bottom dies 8, 3 are pressed axially with respect to the longitudinal axis "a" of insert 1, to form an insert 1 with a cylindrical base 9 and an extending portion 2, contained within the envelope of the cylindrical base. Positive draft must be provided so as to keep extending portion 2 within the constraints of the cylindrical base. Draft refers to the taper given to internal sides of a closed-die to facilitate its removal from the die cavity. To complete the conventional insert 1, a centerless grind operation is performed on the base portion 9 to provide specified cylindrical geometry and surface finish. In centerless grinding the insert 1 is supported on a work rest and fed between the grinding wheel and a rubber bonded abrasive regulating wheel. Guides on either side of the wheels direct the work to and from the wheels in a straight line.

When inserts have extending geometries that extend out to and beyond the envelope of the cylindrical base as contemplated by the present invention, conventional manufacturing techniques such as axial insert pressing and centerless grinding cannot be used. Techniques have been and are being developed to provide the ability to create the novel inserts of the present invention such as those shown in FIGS. 5–18. For example, instead of pressing each insert along the longitudinal axis of its base "a," the inserts of the present invention (such as insert 110 of FIGS. 6A–D) can be pressed normal to that axis, as shown in FIG. 20, thus creating sides instead of a top and bottom. The present insert 110 can also be manufactured by injection molding, multi-axis CNC milling machine, wire EDM, casting, stereolithography or other free-forming methods.

The insert base portion 112 can be finished by using other grinding methods (post grinder, in-feed centerless grinder) or by single point machining (turning).

Other Applications for Invention

Application of this invention is not restricted to use on the rolling cones of insert bits. The cutter elements can be used on the primary rows of big hole cutters and the bottom hole cutting elements of hammer bits. Further, the advantages of this invention are not limited to inserts or compacts, but can be equally applied to teeth of a steel tooth bit.

Figure 32:
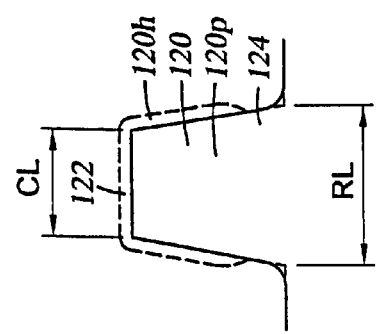
FIG. 32 is a profile of a single prior art steel tooth.

Steel tooth bits typically have teeth that are milled, cast or otherwise integrally formed from the base material or parent metal of the cone. FIGS. 21A–B depict a portion of a rolling cone cutter of a steel tooth bit. Specifically, FIGS. 21A–B depict a row 120 a having steel teeth 120. The other inner rows of steel teeth of this cone cutter are not shown in these figures. The profile of steel tooth 120 is best shown in FIG. 32. Tooth 120 is depicted in FIGS. 21A–B without hard facing, a hard, durable metal coating that is applied to the parent metal of tooth 120 to increase its durability. The hard facing 120h and parent metal 120p of tooth 120 are shown in FIG. 32. As shown, the parent metal of conventional tooth 120 includes crest 122 having crest length (CL) and a root 124 with a root length (RL) that is greater than (CL).

Figure 22A:
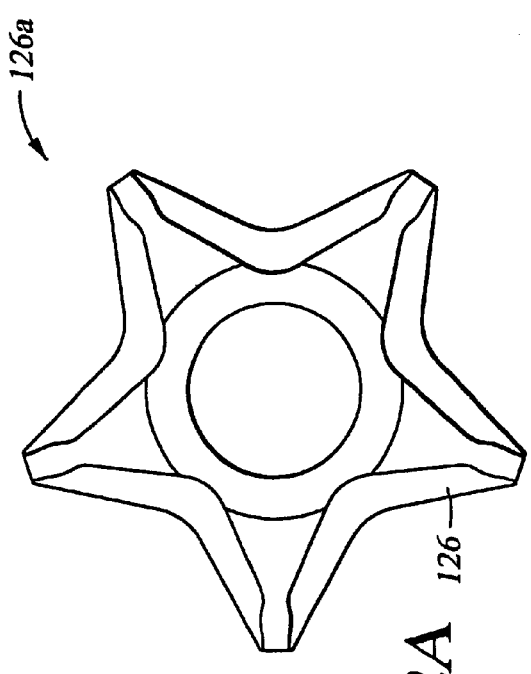
FIGS. 22A–B are top and side views, respectively, of a row of prior art steel teeth having radiused crests.
Figure 22B:
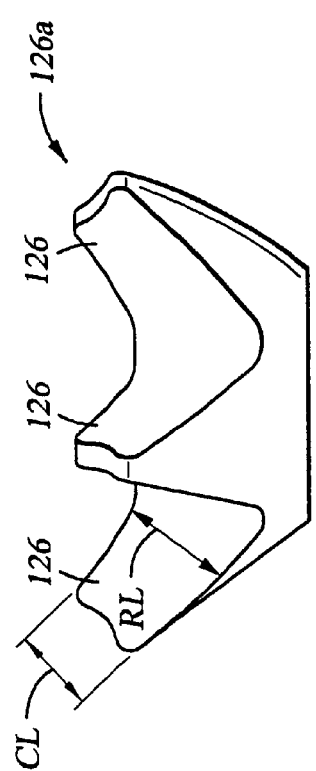
Figure 34:
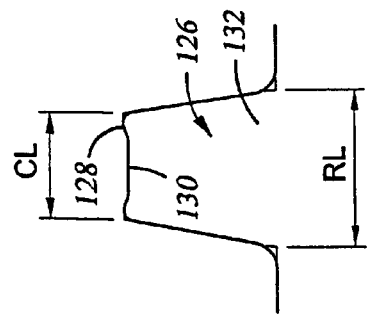
FIG. 34 is a profile of a single prior art radiused steel tooth.

FIGS. 22A–B disclose a row 126 a of steel teeth 126 of a prior art cone cutter. FIG. 34 discloses a profile view of tooth 126. As shown, tooth 126 includes a crest 128 having recess 130 and root 132. As with tooth 120, tooth 126 includes a root 132 having root length (RL) greater than the crest length (CL) of crest 128. The crest 128 having recess 130 is referred to herein as a radiused crest steel tooth.

Figure 36:
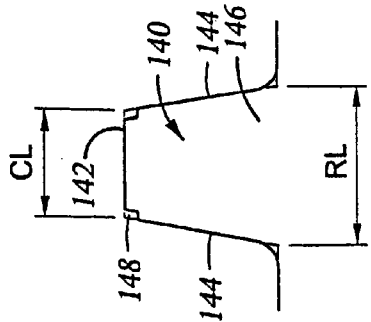
FIG. 36 is a profile of a single prior art inverted radius steel tooth.

FIG. 36 shows a profile view of another prior art tooth 140 similar to teeth 120, 126 previously described. Tooth 140 includes crest 142, sides 144 and root 146. The corners of the tooth 140 at the intersection of sides 144 and crest 142 have an inverted radius at 148.

Figure 37:
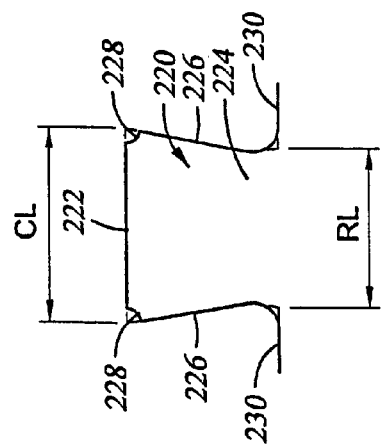
FIG. 37 is a profile of a single inverted radius steel tooth constructed in accordance with the present invention.
Figure 35:
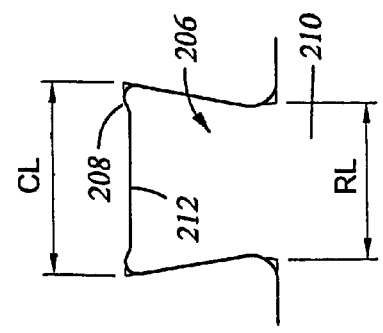
FIG. 35 is a profile of a single radiused steel tooth constructed in accordance with the present invention.
Figure 33:
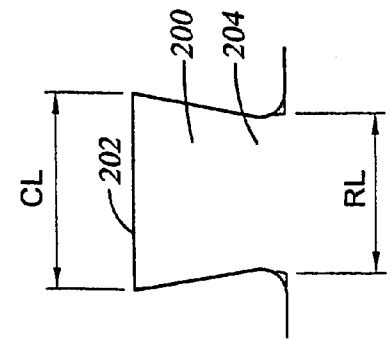
FIG. 33 is a profile of a first embodiment of a single steel tooth constructed in accordance with the present invention.

On conventional steel tooth bits, the width of the cutting portion of the parent metal of the tooth is smaller than the width of its base. More specifically, the crest length (CL) is less than the root length (RL) of the tooth for a conventional steel tooth as best shown in FIGS. 32, 34 and 36. By contrast, in this invention, the width of the cutting portion of the tooth can be larger than the base, before hardfacing is applied, as shown in FIGS. 33, 35 and 37. Although the steel tooth does not have a cylindrical base portion with a cutting portion extending beyond this base portion, the cutting portion does have a substantially wider crest length than the root length of conventional bits. This wider crest length, and the increased bottom hole coverage it provides, maximizes the scraping and shearing action on the formation, thus significantly improving the penetration rate of the bit. Several variations of steel teeth designed according to the principles of the present invention are described below and illustrated in FIGS. 23 through 27. For each embodiment in FIGS. 23 through 27, the comments in Table II describe the mechanical advantages that are believed to result from the specific features of that embodiment.

TABLE II

Figure 23A:
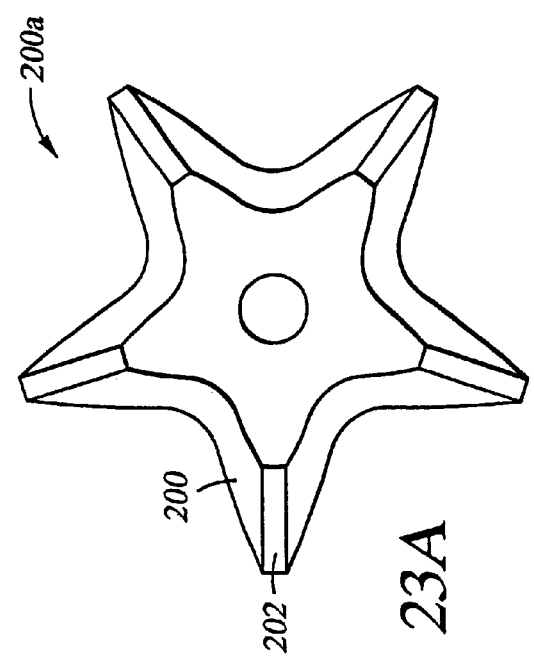
FIGS. 23A–B are top and side views, respectively, of a row of steel teeth having negative draft in accordance with the present invention.
Figure 23B:
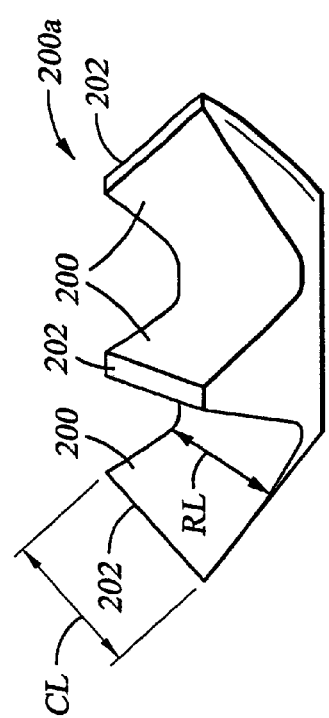
Figure 25A:
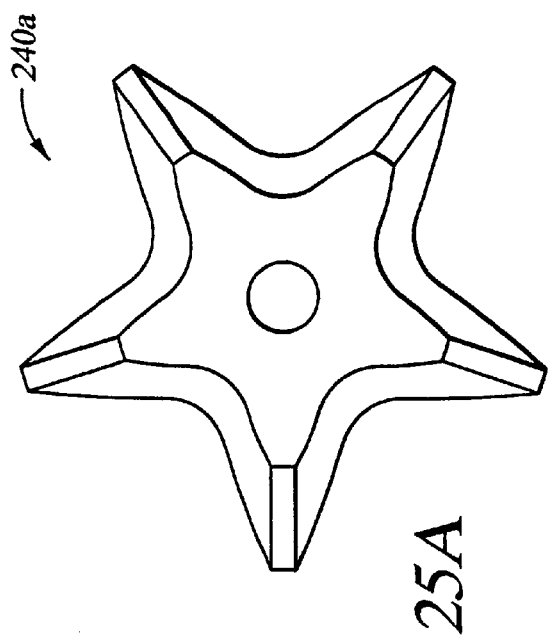
FIGS. 25A–B are top and side views, respectively, of a row of biased steel teeth having negative draft in accordance with the present invention.
Figure 25B:
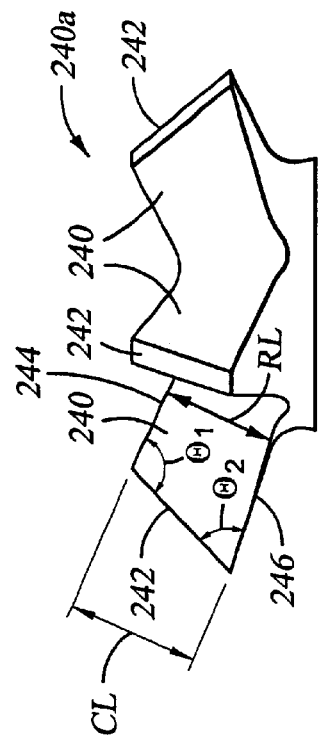
Figure 24A:
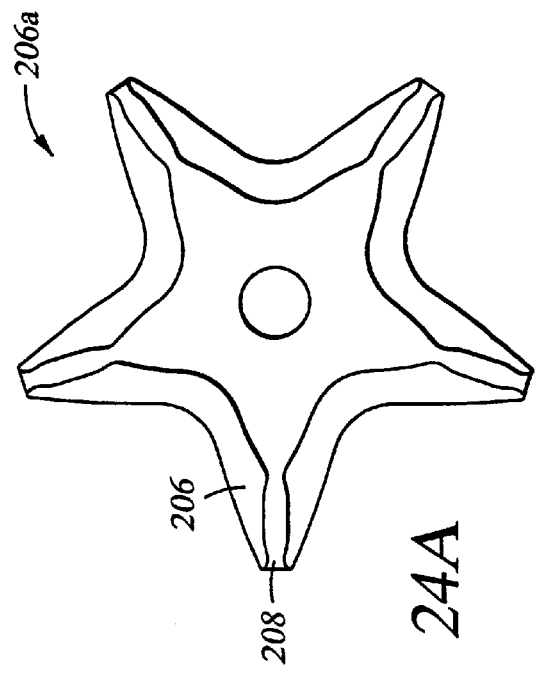
FIGS. 24A–B are top and side views, respectively, of a row of steel teeth having negative draft and radiused crests in accordance with the present invention.
Figure 24B:
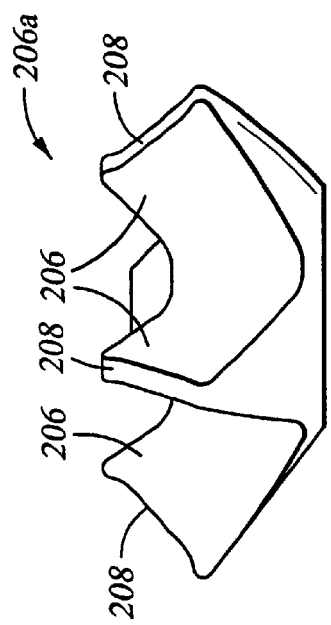
Figure 26A:
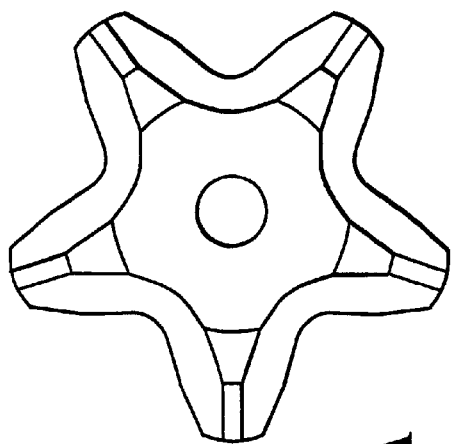
FIGS. 26A–B are top and side views, respectively, of a row of steel teeth having partial negative draft in accordance with the present invention.
Figure 26B:
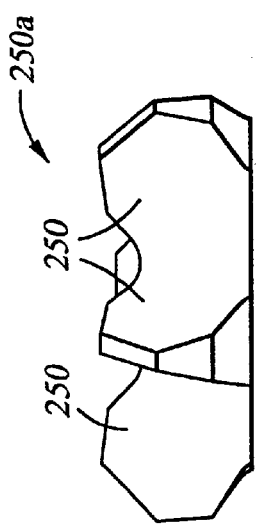

| FIG. 23A-B | Negative draft steel tooth. | Increased mechanical scraping/shearing action due to increased crest length beyond prior art steel teeth. |
|---|---|---|
| FIG. 24A-B | Negative draft steel tooth with radiused crest. | Similar to FIG. 21, but employing the benefits of the radiused or rounded corners to enhance the retention of hardfacing onto the tooth (as described in Smith International patent 5,152,194). |
| FIG. 25A-B | Biased negative draft steel tooth. | Optimize scraping action where tooth-to-tooth clearances between cones is constrained. |
| FIG. 26A-B | Partial negative draft steel tooth. | Tooth crest corner protection for tougher applications. |

TABLE II-continued

Figure 27A:
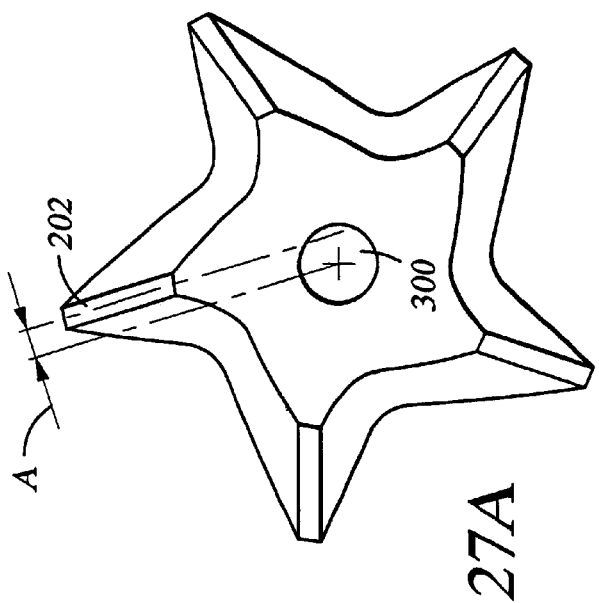
FIGS. 27A–B are top and side views, respectively of a steel tooth having an offset crest and negative draft in accordance with the present invention.
Figure 27B:
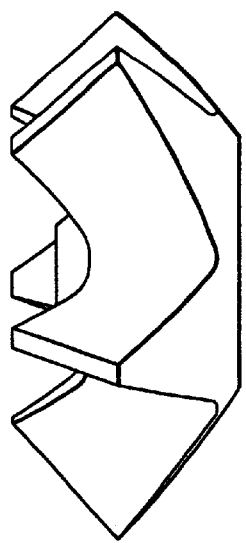

| FIG. 27A-B | Offset crest steel tooth with negative draft. | Optimize aggressive scraping action in specific applications. |
|---|---|---|

In the more detailed description that follows, the steel teeth of the invention will be described and depicted without hardfacing, it being understood that hardfacing could, and in many applications would, be applied over the parent metal of the tooth.

One embodiment of the present invention employed in a steel tooth bit is shown in FIGS. 23A, 23B and 33. The rolling cone cutter includes a row 200a of steel teeth 200. As best shown in FIG. 33, tooth 200 includes a crest 202 and root 204. Crest length (CL) of crest 202 is greater than root length (RL) of root portion 204.

Another embodiment of the present invention is shown in FIGS. 24A, 24B and 35. As shown, the rolling cone cutter includes a row 206a of radiused crest steel teeth 206. As best shown in the profile view of FIG. 35, tooth 206 includes crest 208 and root portion 210. Crest 208 includes a recess 212. Tooth 206 is formed such that crest length (CL) is greater than root length (RL) in accordance with the principles of the present invention.

Another embodiment of the present invention is shown in FIG. 37. FIG. 37 is a profile view of a steel tooth similar to that shown in FIGS. 33 and 35. In the embodiment shown in FIG. 37, tooth 220 includes crest 222 and root 224. The crest length (CL) of crest 222 is greater than root length (RL) of root 224. The corners of tooth 220 formed at the intersection of crest 222 and sides 226 includes a portion 228 having an inverted radius. In this embodiment, the crest length is measured between the points of intersection formed by extensions of the crest 222 and sides 226 as shown in FIG. 37. Similarly, the root length is measured between the intersections of the extensions of sides 226 and cone surface 230.

Referring to FIGS. 25A–B, another embodiment of the present invention is applied to a steel tooth bit. As shown, the steel tooth cone cutter includes a row 240a of steel teeth 240. Each tooth 240 includes a crest 242 and a root portion 243. Crest 242 intersects sides 244, 246 in angles $\theta_1$ and $\theta_2$, respectively. As shown, $\theta_1$ is an angle greater than 90°, while $\theta_2$ is an angle less than 90°. The crest length (CL) of crest 242 is greater than the root length (RL) of root 243. Although in this particular embodiment, $\theta_1$ is greater than $\theta_2$, the invention is not limited to this or any other relationship for $\theta_1$ and $\theta_2$. Likewise, the crest can take various forms such as a rounded crest or non-linear crest, but the intent is that the overall linearly-measured width of the crest exceeds that of the root.

Figure 38:
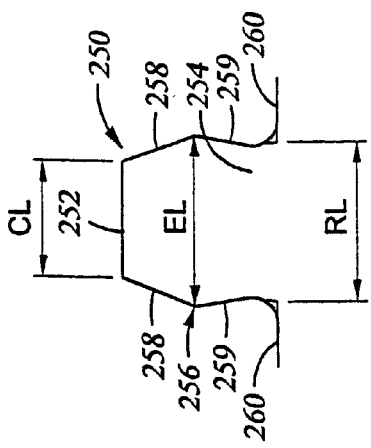
FIG. 38 is a profile of a single steel tooth having a partial negative draft and constructed in accordance with the present invention.

Another embodiment of the invention is shown in FIGS. 26A–B, and FIG. 38. As shown, a steel tooth cone cutter includes a row 250a of steel teeth 250. Each tooth 250 includes a crest 252, root portion 254, a pair of upper sides 258 and a pair of lower sides 259. The intersection of each upper side 258 and lower side 259 forms a central portion having an expanded length EL that is greater than root length (RL) and, in this embodiment, greater than crest length (CL). The root length (RL) is measured from the intersections of the extensions of lower sides 259 and cone surface 260.

FIG. 27A and 27B shown an embodiment similar to that depicted in FIGS. 23A, 23B; however, the embodiment shown in FIGS. 27A, 27B is formed such that crest 202 is offset a distance D from a line that is parallel to crest 202 and that passes through the axis 300 of the cone. Crest orientations similar to TCI FIGS. 30 and 31 can also be applied to steel tooth designs.

Bit Design Intent

Depending on the bit design objectives, the amount of uncut bottom can be reduced or eliminated. Currently, most bits are designed with cutter intermesh between the rolling cones, which can invoke limitations on the wider crest of the cutter elements. Hence, designing bits without intermesh can allow greater latitude in crest width.

Additionally, these cutter elements can be used in all types of rolling cone bits having one, two or more rolling cones.

Figure 39:
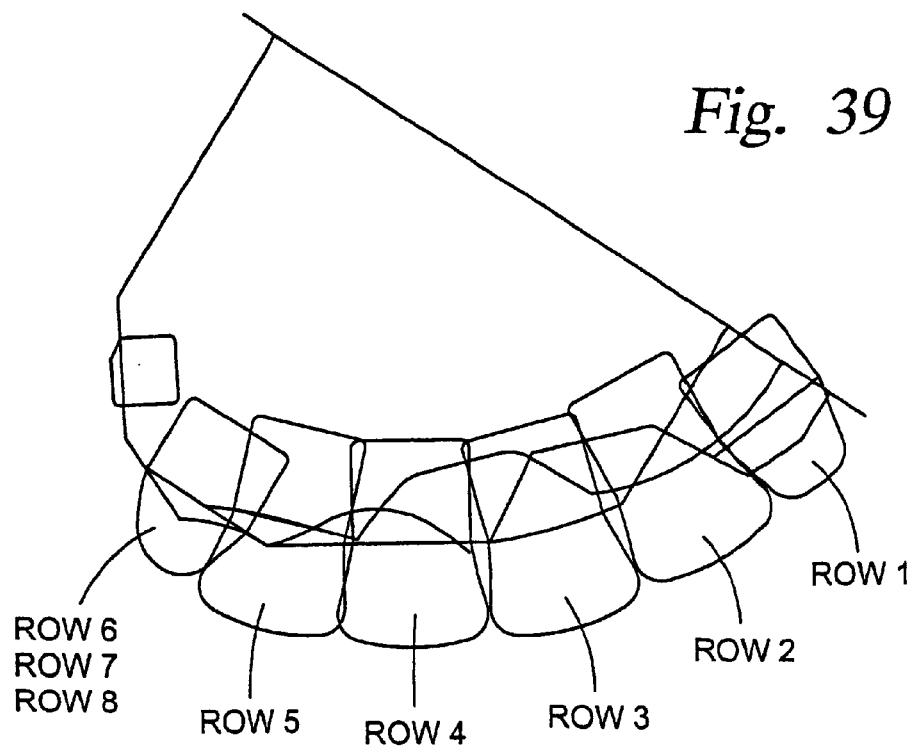
FIG. 39 is a profile of an eight row tungsten carbide insert bit showing inserts constructed in accordance with the present invention rotated into a single plane.

The increased bottom hole coverage attainable with the present invention permits the use of fewer rows of cutter elements on the cone cutters of the bit. Having fewer rows of cutter elements, as compared to conventional prior art bits, increases the unit loading per cutter element thus increasing rate of penetration. For example, in one conventional 3-cone TCI roller cone bit, a total of nine rows of primary cutter elements were dispersed among the three cones employed to cut the bottom hole as shown in rotated profile in FIG. 3E, there being three rows, specifically Rows 7, 8 and 9, aligned in the same rotated profile position. Using the expanded crest geometry of the present invention, and as shown in rotated profile FIG. 39, the bottom hole coverage can be attained using only a total of 8 rows of cutter elements on this 3-cone bit. Thus, the present invention allows TCI bits to be designed with 8 or fewer rows, in contrast to conventional prior art TCI bits, which typically have 9 or more rows.

Figure 40:
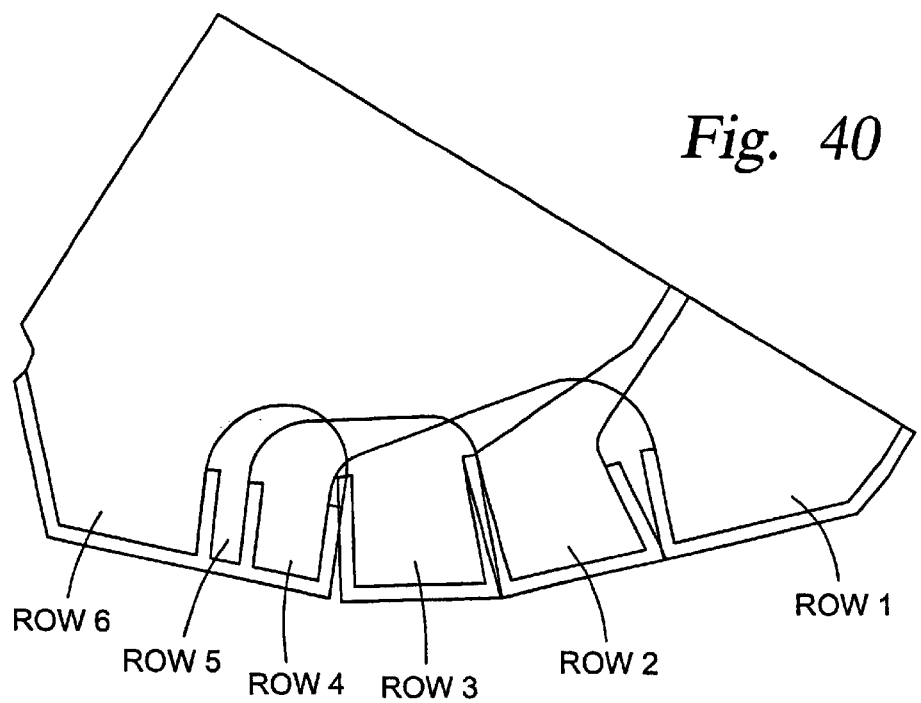
FIG. 40 is a profile of a steel tooth bit showing teeth constructed in accordance with the present invention rotated into a single plane.
Figure 41:
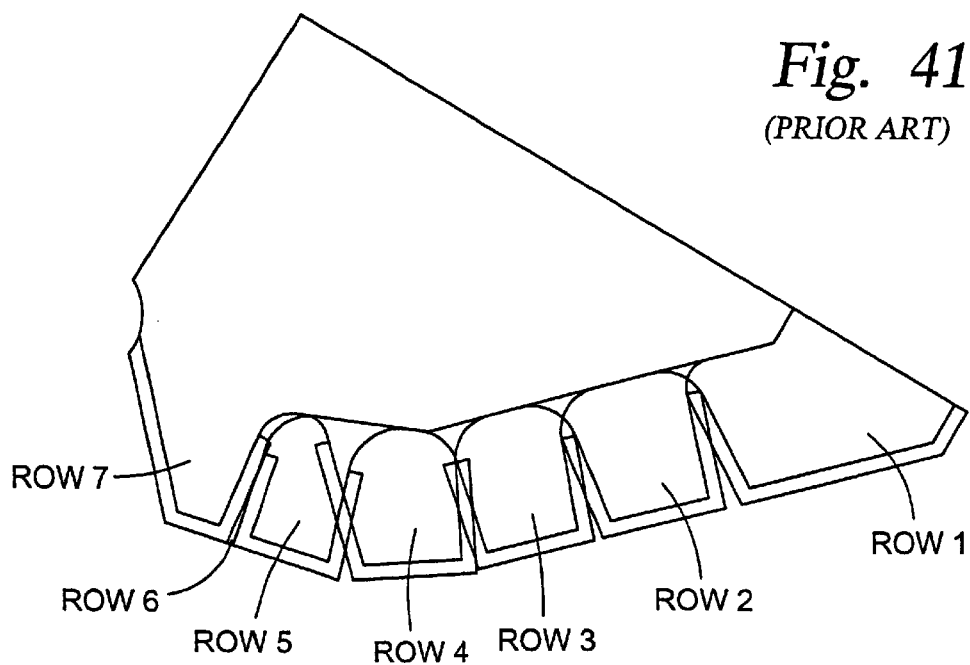
FIG. 41 is a profile of a steel tooth bit showing conventional steel teeth rotated into a single plane.

Similarly, prior art steel tooth bits such as that shown in rotated profile in FIG. 41 typically included a total of seven rows of cutter elements for bottom hole coverage. Use of the present invention, as shown in FIG. 40, permits bottom hole coverage to be attained using only six rows of cutter elements made in accordance with the present invention. Thus, the present invention allows steel tooth bits to be designed with 6 or fewer rows, in contrast to conventional prior art steel tooth bits, which typically have 7 or more rows.

While various preferred embodiments of the invention have been shown and described, modifications thereof can be made by one skilled in the art without departing from the spirit and teachings of the invention. The embodiments described herein are exemplary only, and are not limiting. For example, the present invention includes cutter elements having shapes other than the shapes shown and described herein. Many variations and modifications of the invention and apparatus disclosed herein are possible and are within the scope of the invention. Accordingly, the scope of protection is not limited by the description set out above, but is only limited by the claims that follow, that scope including all equivalents of the subject matter of the claims.

What is claimed is:

1. A drill bit comprising:
   a bit body;
   at least one roller cone rotatably mounted on a cantilevered bearing shaft depending from said bit body, said cone having a cone axis; and
   at least one primary cutter element extending from said roller cone, said primary cutter element having an extending portion that has a non-positive draft.

2. The bit in accordance with claim 1 wherein said extending portion has a zero draft.

3. The bit in accordance with claim 1 wherein said extending portion has a negative draft.

4. The bit in accordance with claim 1 wherein said extending portion has a contoured surface.

5. The bit in accordance with claim 1 wherein said extending portion has an elongated crest.

6. The bit in accordance with claim 1 wherein said cutter element includes a non-cylindrical base portion.

7. The bit in accordance with claim 1 wherein said cutter element includes a non-circular base portion.

8. The bit in accordance with claim 1 wherein said cutter element is in an inner row.

9. A drill bit comprising:
   a bit body;
   at least one roller cone rotatably mounted on a cantilevered bearing shaft depending from said bit body, said cone having a cone axis; and
   at least one primary cutter element extending from said roller cone, said primary cutter element having an extending portion that has a non-positive draft;
   wherein said cutter element has a longitudinal axis and a crest having a centerline and said centerline is not parallel to a projection of the cone axis when viewed along said longitudinal axis.

10. A drill bit comprising:
    a bit body;
    at least one roller cone rotatably mounted on a cantilevered bearing shaft depending from said bit body, said cone having a cone axis; and
    at least one primary cutter element extending from said roller cone, said primary cutter element having an extending portion that has a non-positive draft;
    wherein said cutter element has a longitudinal axis and said longitudinal axis is offset such that it does not intersect the axis of said cone.

11. A drill bit comprising:
    a bit body;
    at least one roller cone rotatably mounted on a cantilevered bearing shaft depending from said bit body, said cone having a cone axis; and
    at least one primary cutter element extending from said roller cone, said primary cutter element having an extending portion that has a non-positive draft;
    wherein said cutter element has a longitudinal axis and a crest having a centerline and said centerline is not parallel to a projection of the cone axis when viewed along said longitudinal axis and said longitudinal axis is offset such that it does not intersect the axis of said cone.

12. A drill bit comprising:
    a bit body;
    at least one roller cone rotatably mounted on said bit body and including a socket, said cone having a cone axis; and
    a plurality of primary cutter inserts extending from said roller cone, at least one of said primary cutter inserts having a base and an extending portion that has negative draft, said base being inserted into said socket.

13. The bit in accordance with claim 12 wherein at least two inserts have negative draft.

14. The bit in accordance with claim 12 wherein at least a second insert has an extending portion having zero draft.

15. The bit in accordance with claim 12 wherein at least one insert has an extending portion having a contoured surface.

16. The bit in accordance with claim 12 wherein said at least one insert has an elongated crest.

17. The bit in accordance with claim 12 wherein said at least one insert has a non-cylindrical base.

18. A drill bit comprising:
a bit body;
at least one roller cone rotatably mounted on said bit body and including a socket, said cone having a cone axis; and
a plurality of primary cutter inserts extending from said roller cone, at least one of said primary cutter inserts having a base and an extending portion that has negative draft, said base being inserted into said socket;
wherein said at least one insert has a longitudinal axis and a crest having a centerline and said centerline is not parallel to a projection of the cone axis when viewed along said longitudinal axis.

19. A drill bit comprising:
a bit body;
at least one roller cone rotatably mounted on said bit body and including a socket, said cone having a cone axis; and
a plurality of primary cutter inserts extending from said roller cone, at least one of said primary cutter inserts having a base and an extending portion that has negative draft, said base being inserted into said socket;
wherein said at least one insert has a longitudinal axis and said longitudinal axis is offset such that it does not intersect the axis of said cone.

20. A drill bit comprising:
a bit body;
at least one roller cone rotatably mounted on said bit body and including a socket, said cone having a cone axis; and
a plurality of primary cutter inserts extending from said roller cone, at least one of said primary cutter inserts having a base and an extending portion that has negative draft, said base being inserted into said socket;
wherein said at least one insert has a longitudinal axis and a crest having a centerline and said centerline is not parallel to a projection of the cone axis when viewed along said longitudinal axis and said longitudinal axis is offset such that it does not intersect the axis of said cone.

21. A drill bit comprising:
a bit body;
at least one roller cone rotatably mounted on said bit body, said cone having a cone axis; and
at least one primary cutter element extending from said roller cone, said primary cutter element having a base, a longitudinal axis and an extending portion, said base portion defining an envelope and said extending portion extending beyond the envelope defined by said base.

22. A drill bit comprising:
a bit body;
at least one roller cone rotatably mounted on said bit body, said cone having a cone axis; and
at least one primary cutter element extending from said roller cone, said primary cutter element having a base, a longitudinal axis and an extending portion, said base portion defining an envelope and said extending portion extending beyond the envelope defined by said base;
wherein said cutter element has a longitudinal axis and a crest having a centerline and said centerline is not parallel to a projection of the cone axis when viewed along said longitudinal axis.

23. A drill bit comprising:
a bit body;
at least one roller cone rotatably mounted on said bit body, said cone having a cone axis; and
at least one primary cutter element extending from said roller cone, said primary cutter element having a base, a longitudinal axis and an extending portion, said base portion defining an envelope and said extending portion extending beyond the envelope defined by said base;
wherein said cutter element has a longitudinal axis and said longitudinal axis is offset such that it does not intersect the axis of said cone.

24. A drill bit comprising:
a bit body;
at least one roller cone rotatably mounted on said bit body, said cone having a cone axis; and
at least one primary cutter element extending from said roller cone, said primary cutter element having a base, a longitudinal axis and an extending portion, said base portion defining an envelope and said extending portion extending beyond the envelope defined by said base;
wherein said cutter element has a longitudinal axis and a crest having a centerline and said centerline is not parallel to a projection of the cone axis when viewed along said longitudinal axis and said longitudinal axis is offset such that it does not intersect the axis of said cone.

25. A bit in accordance with claim 21 wherein said cutter element includes a non-cylindrical base portion.

26. A bit in accordance with claim 21 wherein said cutter element includes a non-circular base portion.

27. A bit in accordance with claim 21 wherein said cutter element is in an inner row.

28. A drill bit for cutting a formation, comprising:
a bit body;
at least two rolling cone cutters rotatable mounted on said bit body, each cone having a cone axis;
a plurality of primary cutter elements mounted on each rolling cone cutter, said cutter elements on at least two rolling cone cutters intermeshing;
at least one primary cutter element having a base portion and an extending portion, said base portion defining an envelope and said extending portion extending beyond the envelope defined by said base portion.

29. The bit in accordance with claim 28 wherein at least one primary cutting element has an extending portion having a contoured surface.

30. The bit in accordance with claim 28 wherein said at least one primary cutting element has an elongated crest.

31. The bit in accordance with claim 28 wherein said at least one primary cutting element has a non-cylindrical base.

32. A drill bit for cutting a formation, comprising:
a bit body;
at least two rolling cone cutters rotatably mounted on said bit body, each cone having a cone axis;

a plurality of primary cutter elements mounted on each rolling cone cutter, said cutter elements on at least two rolling cone cutters intermeshing; and at least one primary cutter element having a base portion and an extending portion, said base portion defining an envelope and said extending portion extending beyond the envelope defined by said base portion;

wherein said at least one primary cutting element has a longitudinal axis and a crest having a centerline and said centerline is not parallel to a projection of the cone axis when viewed along said longitudinal axis.

33. A drill bit for cutting a formation, comprising:

a bit body;

at least two rolling cone cutters rotatably mounted on said bit body, each cone having a cone axis;

a plurality of primary cutter elements mounted on each rolling cone cutter, said cutter elements on at least two rolling cone cutters intermeshing; and at least one primary cutter element having a base portion and an extending portion, said base portion defining an envelope and said extending portion extending beyond the envelope defined by said base portion;

wherein said at least one primary cutting element has a longitudinal axis and said longitudinal axis is offset such that it does not intersect the axis of said cone.

34. A drill bit for cutting a formation, comprising:

a bit body;

at least two rolling cone cutters rotatably mounted on said bit body, each cone having a cone axis;

a plurality of primary cutter elements mounted on each rolling cone cutter, said cutter elements on at least two rolling cone cutters intermeshing; and at least one primary cutter element having a base portion and an extending portion, said base portion defining an envelope and said extending portion extending beyond the envelope defined by said base portion;

wherein said at least one primary cutting element has a longitudinal axis and a crest having a centerline and said centerline is not parallel to a projection of the cone axis when viewed along said longitudinal axis and said longitudinal axis is offset such that it does not intersect the axis of said cone.

35. The bit in accordance with claim 1 wherein said cutter element is a steel tooth.

36. The bit according with claim 1 wherein said cutter element is a steel tooth having a root portion having a root length and a crest portion having a crest length and said crest length is greater than said root length.

* * * * *